United States Patent
Akers, II et al.

(10) Patent No.: US 11,647,731 B2
(45) Date of Patent: *May 16, 2023

(54) CATCH DRAWER LITTER BOX

(71) Applicant: The Grate Litter Box, LLC, Silverthorne, CO (US)

(72) Inventors: Danny W. Akers, II, Silverthorne, CO (US); Kellie C. Akers, Silverthorne, CO (US)

(73) Assignee: The Grate Litter Box, LLC, Silverthorne, CO (US)

(*) Notice: Subject to any disclaimer, the term of this patent is extended or adjusted under 35 U.S.C. 154(b) by 46 days.

This patent is subject to a terminal disclaimer.

(21) Appl. No.: 17/338,849

(22) Filed: Jun. 4, 2021

(65) Prior Publication Data
US 2021/0289740 A1  Sep. 23, 2021

Related U.S. Application Data

(63) Continuation of application No. 16/430,626, filed on Jun. 4, 2019, now Pat. No. 11,026,396, which is a continuation-in-part of application No. 15/646,346, filed on Jul. 11, 2017, now abandoned.

(51) Int. Cl.
*A01K 1/01* (2006.01)

(52) U.S. Cl.
CPC .................. *A01K 1/0107* (2013.01)

(58) Field of Classification Search
CPC ..... A01K 1/0107; A01K 1/0114; A01K 1/011
See application file for complete search history.

(56) References Cited

U.S. PATENT DOCUMENTS

| | | |
|---|---|---|
| 3,246,630 A | 4/1966 | Dearing |
| 3,482,546 A | 12/1969 | Anderson |
| 3,618,568 A | 11/1971 | Breeden |
| 3,830,200 A | 8/1974 | Patterson |
| 3,885,523 A | 5/1975 | Coleman |
| 3,990,397 A | 11/1976 | Lowe, Jr. |
| 4,085,705 A | 4/1978 | Gland |
| 5,058,528 A | 10/1991 | Counsellor |

(Continued)

OTHER PUBLICATIONS https://www.kickstarter.com/projects/1825968149/grand-poobox-the-kitty-litter-box-with-purrr-puss?ref=nav_search&result=project&term=grand%20poobox; Kickstarter; Feb. 27, 2016.

(Continued)

*Primary Examiner* — Tien Q Dinh
*Assistant Examiner* — William L Gmoser
(74) *Attorney, Agent, or Firm* — Inskeep IP Group, Inc.

(57) ABSTRACT

A catch drawer litter box for the recovery of litter and prevention of unwanted dispersal outside of a litter box. The catch drawer litter box generally includes a base and a cover. The base generally comprises a recovery region, a litter region, and a base divider separating these two regions. The litter region generally comprises a litter container configured for the receipt of litter comprising litter particles. Recovery region generally comprises a grate with openings large enough to allow passage of litter particles and a recovery drawer configured for removable deposition within the recovery region via an opening in the base. The recovery drawer is configured to receive at least a portion of the particles of litter that may pass through the openings in the grate.

18 Claims, 21 Drawing Sheets

(56) References Cited

U.S. PATENT DOCUMENTS

| | | | |
|---|---|---|---|
| 5,092,270 | A | 3/1992 | Simons |
| 5,184,568 | A | 2/1993 | Healey |
| 5,195,464 | A | 3/1993 | Mutter |
| 5,220,886 | A | 6/1993 | Hyde |
| 5,361,725 | A | 11/1994 | Baillie |
| 5,785,000 | A | 7/1998 | Barbary |
| 5,806,461 | A | 9/1998 | Kiera |
| 6,176,201 | B1 | 1/2001 | Fields |
| 6,237,534 | B1 | 5/2001 | Schwartz |
| 6,341,579 | B1 * | 1/2002 | Alkire .............. A01K 1/0107 119/493 |
| 6,371,048 | B1 | 4/2002 | Smith |
| 6,945,193 | B1 | 9/2005 | Tanner |
| 7,628,118 | B1 | 12/2009 | Nottingham |
| 7,673,585 | B1 | 3/2010 | Emmi |
| 8,733,286 | B2 | 5/2014 | Sweetman |
| 9,107,383 | B2 | 8/2015 | Khalili |
| D754,406 | S | 4/2016 | Karsted |
| 2003/0075115 | A1 | 4/2003 | Thompson |
| 2009/0000559 | A1 | 1/2009 | Matsuo |
| 2009/0250014 | A1 | 10/2009 | Juan |
| 2011/0067639 | A1 | 3/2011 | Bauer |
| 2013/0276714 | A1 | 10/2013 | Bauer |
| 2013/0327278 | A1 | 12/2013 | Reichert |
| 2016/0302379 | A1 | 10/2016 | Sprague |
| 2018/0055002 | A1 | 3/2018 | Carroll |
| 2019/0373844 | A1 * | 12/2019 | Ward .............. A01K 1/0107 |

OTHER PUBLICATIONS https://web.archive.org/web/20170710151857/https://grandpoobox.com/; Archive.org Page for www.grandpoobox.com; Jul. 10, 2017.

https://www.amazon.com/Furrytail-Scooper-Prevent-Tracking-Protection/dp/B07RQVNHYW; Furrytail Glow House Cat Litter Box Amazon Webpage.

* cited by examiner

CATCH DRAWER LITTER BOX

CROSS REFERENCE TO RELATED APPLICATIONS

The present application is a continuation of U.S. application Ser. No. 16/430,626 filed Jun. 4, 2019 which issues as U.S. Pat. No. 11,026,396 on Jun. 8, 2021, which is a continuation-in-part of U.S. application Ser. No. 15/646,346 filed Jul. 11, 2017. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a catch drawer litter box for the recovery of litter and prevention of unwanted dispersal outside of a litter box.

Related Art

Any discussion of the related art throughout the specification should in no way be considered as an admission that such related art is widely known or forms part of common general knowledge in the field.

A litter box, which is sometimes referred to as a sandbox, is an indoor waste collection box for small animals. They are typically used inside homes and dwellings where the occupants have house cats as pets. As its name suggests, a litter box contains litter, which in this context, refers to a type of gravel that is well-suited to handle urine and animal feces. When used for house cats, the litter is generally referred to as cat litter. Ideally, a house cat will preferentially use a litter box for elimination of bodily waste. After elimination, the house cat will usually use its paws to kick or cover its waste products with litter.

Because this waste removal process includes a cat using its paws to cover its waste products, it may result in litter being propelled in arbitrary directions. Depending on the configuration of the litter box, this may result in litter being propelled outside of the litter box into the surrounding area. In addition, litter may adhere to the cat's paws during this process. Once the cat leaves the litter box, this litter will tend to be spread across areas along the cat's immediate path. Thus, such litter could be found some distance away from the litter box. Because used litter is likely to contain urine and feces, its spread may present a health and cleanliness problem.

In order to control the spread of litter throughout a home containing a house cat, various solutions have been used. In some cases, a litter box is placed within a covered enclosure with a single opening for entry and exit of a house cat. This type of litter box prevents the spread of litter in directions other than that of the entry opening. Although the spread of litter during the burial portion of the process is reduced, it may still occur in the direction of the entrance, which is adjacent to the litter. Moreover, this does nothing to prevent the spread of litter that may be attached to the cat's paws.

In other cases, adhesive pads may be placed near the entrance of the litter box. If the cat chooses to walk across the pad, some of the litter stuck to the cat's paws may be stuck to the adhesive pad. However, as it is used, the adhesive pad becomes less effective. Therefore, it must be monitored and replaced to maintain its effectiveness. Moreover, any litter that becomes stuck to the pad cannot be used. Thus, the litter in the litter box must be replaced more frequently. Moreover, some cats will avoid sticky surfaces, which means that the cat will avoid the adhesive pad making it ineffective, or worse, avoid the litter box entirely and find a new place for waste elimination that is less desirable for the owner.

What is needed is a litter box solution that prevents the spread of litter and recovers any litter that might otherwise spread throughout home. Such a litter box solution may include seamless walls so urine can't leak out of the sides and onto the floor. A grate may be provided which is large enough that the cat has to take multiple steps to remove the litter from its paws. The entry to the box and litter area may be configured in an adjacent manner that forces the cat to have to walk across the grate. The entry and interior walls may also be designed in a way to keep dogs out, as dogs will often be attracted to the contents of litter boxes. A drawer under the grate may be used to catch excess litter to be recycled back into the box or disposed of. Windows may be provided for viewing and venting so the cat can see and doesn't feel trapped in the box. A charcoal filter may be positioned within a vent if desired. Holes in the side of the walls may be provided so that the scoop can be hung inside the box to reduce mess outside the box. The entry and interior walls may be designed in a way that helps contain litter within the box when the cat aggressively digs in the litter and flings it everywhere. The entry to the box may be designed with one small step into the box so that most any cat, regardless of age or disability, can easily enter and exit the box.

SUMMARY

An example embodiment is directed to a catch drawer litter box. The catch drawer litter box includes a base and a cover. The base generally comprises a recovery region, a litter region, and a base divider separating these two regions. The litter region generally comprises a litter container configured for the receipt of litter comprising litter particles. Recovery region generally comprises a grate with openings large enough to allow passage of litter particles and a recovery drawer configured for removable deposition within the recovery region via an opening in the base. The recovery drawer is configured to receive at least a portion of the particles of litter that may pass through the openings in the grate. The cover is generally configured to enclose the recovery region and the litter region of the base. The cover also includes an opening that is adjacent to the recovery region that is configured to allow passage of a cat to the litter by passing over the grate. In some embodiments, the top of cover is removable.

Another example embodiment is directed to a catch drawer litter box which includes a container and a cover removably connected to selectively cover an upper end of the container. A cavity is defined within the container, with the cavity being divided between a recovery region for the removal of debris from a cat's paws and a litter region in which a cat may eliminate waste into a volume of litter. An opening on the front end of the container leads to the recovery region of the cavity. A transfer opening is positioned between the recovery region and the litter region of the cavity. A debris container is removably connected to the container within the recovery region of the cavity.

There has thus been outlined, rather broadly, some of the embodiments of the catch drawer litter box in order that the detailed description thereof may be better understood, and in order that the present contribution to the art may be better appreciated. There are additional embodiments of the catch drawer litter box that will be described hereinafter and that will form the subject matter of the claims appended hereto. In this respect, before explaining at least one embodiment of the catch drawer litter box in detail, it is to be understood that the catch drawer litter box is not limited in its application to the details of construction or to the arrangements of the components set forth in the following description or illustrated in the drawings. The catch drawer litter box is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
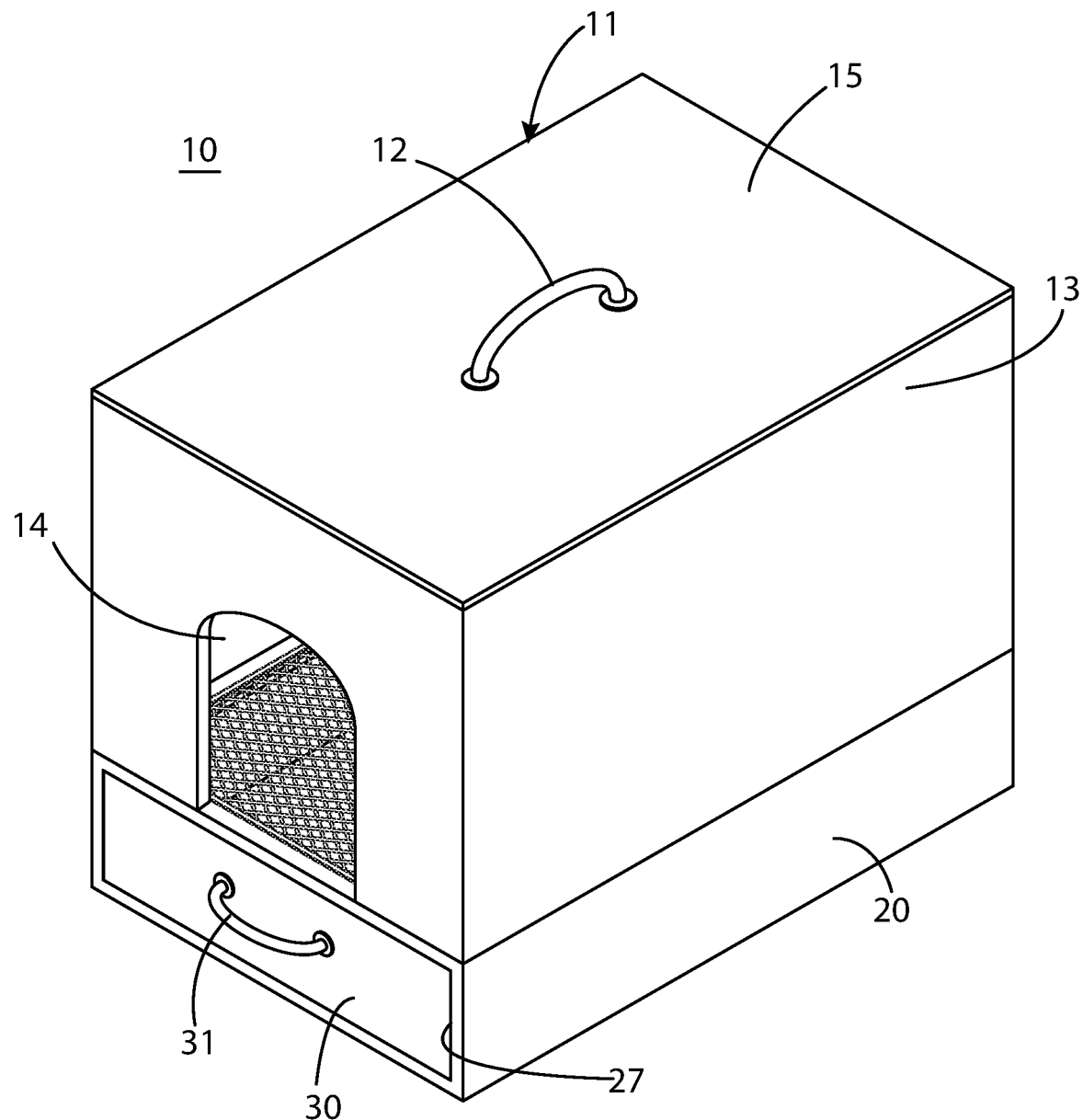
FIG. 1 is a perspective view of a catch drawer litter box in accordance with an example embodiment.
Figure 2:
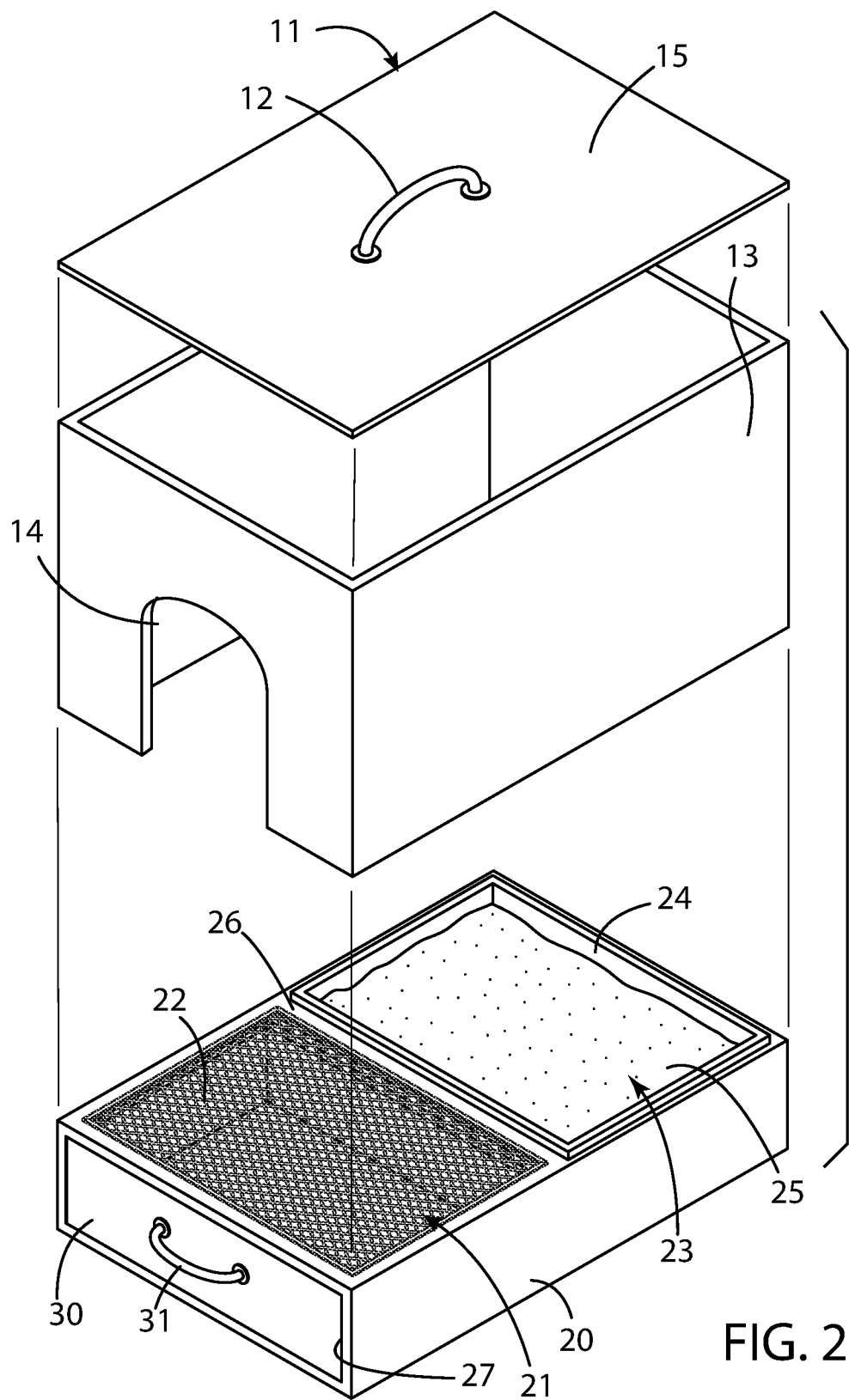
FIG. 2 is a perspective view of a catch drawer litter box with its cover removed in accordance with an example embodiment.

Turning now descriptively to the drawings, in which similar reference characters denote similar elements throughout the several views, FIGS. 1 through 11 illustrate a catch drawer litter box 10 including a base 20 and a cover 11. Base 20 generally comprises a recovery region 21, a litter region 23, and a base divider 26 separating these two regions. In some embodiments, base 20 may comprise a plurality of sides. The recovery side of base 20 is the side that is adjacent to recovery region 21 and is not adjacent to litter region 23. The litter side of base 20 is the side that is adjacent to litter region 23 and is not adjacent to recovery region 21. Common sides of base 20 include sides that are adjacent to both recovery region 21 and litter region 23. Litter region 23 generally comprises a litter container 24 configured for the receipt of litter 25 comprising litter particles. Recovery region 21 generally comprises a grate 22 comprising openings large enough to allow passage of particles of litter 25, and a recovery drawer 30 configured for removable deposition within recovery region 23 via an opening 27 in the recovery side of base 20. Recovery drawer 30 is configured for receipt of at least a portion of the particles of litter 25 that pass through the openings in grate 22. Litter box cover 11 is generally configured to enclose the recovery region 21 of base 20 and the litter region 23 of base 20 and comprises an opening 14 that is adjacent to the recovery region 21. Opening 14 is configured to allow passage of a cat 40 to litter 25 by passing over grate 22. In some embodiments, the top 15 of cover 11 is removably attached and includes a cover handle 12.

B. Base

Figure 4:
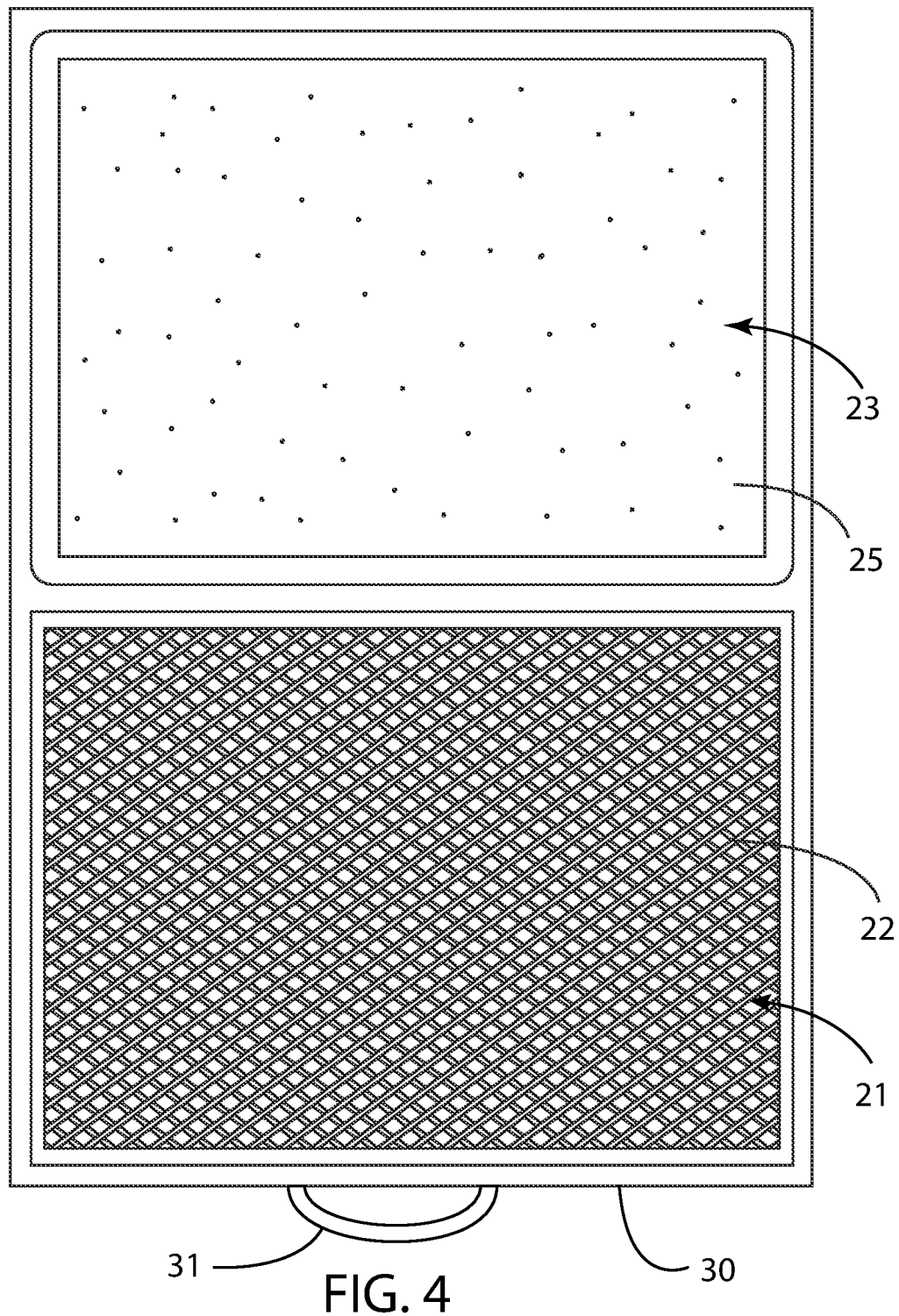
FIG. 4 is a top-down view of the base of a catch drawer litter box in accordance with an example embodiment.
Figure 5:
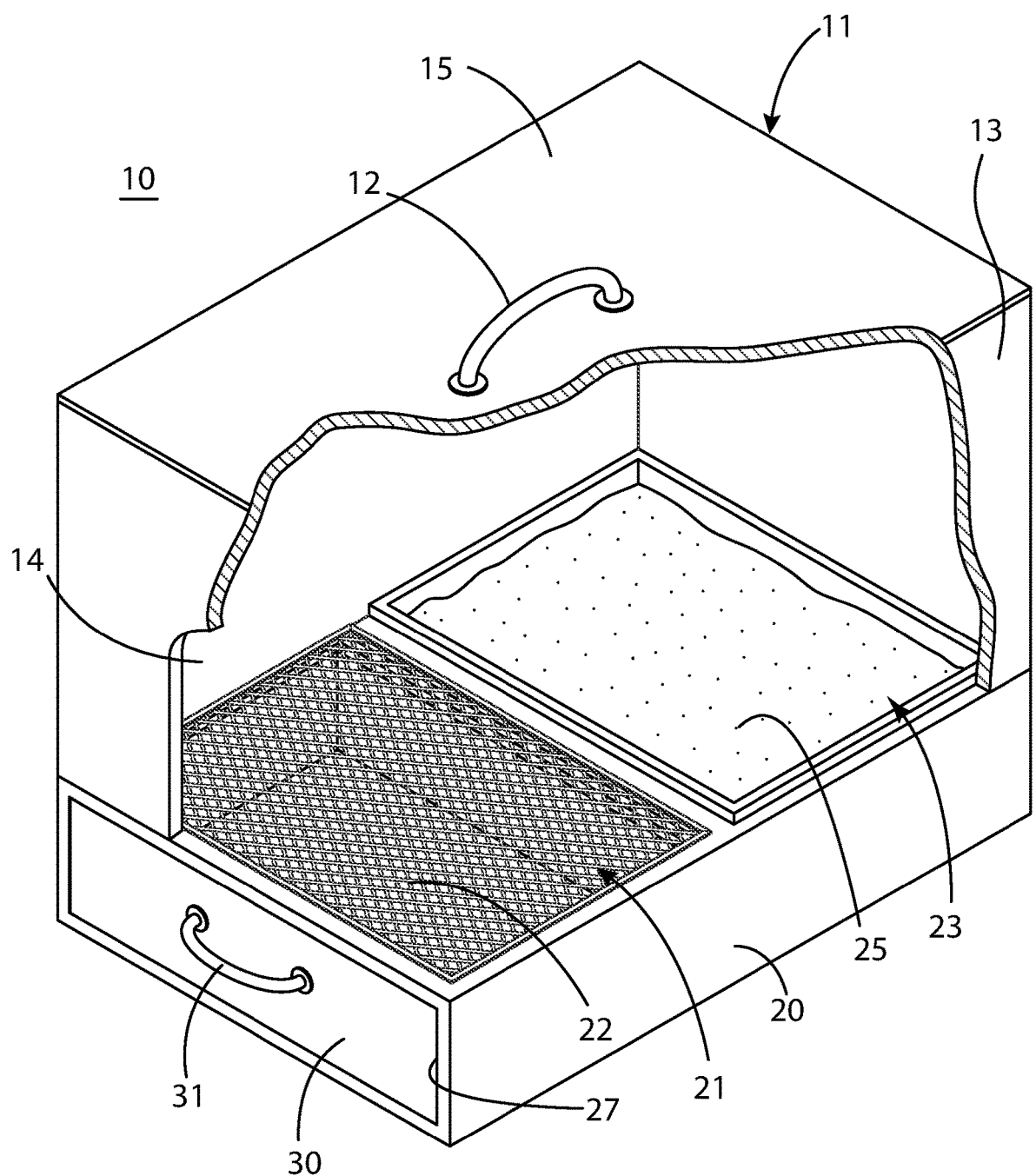
FIG. 5 is a cutaway view of the catch drawer litter box shown in FIG. 1.

As best shown in FIGS. 4 and 5, a base 20 for use with a catch drawer litter box 10 generally comprises a recovery region 21 and a litter region 23. The recovery region 21 generally includes a grate 22 that is configured above a recovery drawer 30. The litter region 23 is generally configured to house a litter container 24. The litter container 24 is configured to receive and hold a quantity of litter 25 comprised of numerous particles. A base divider 26 may be used to separate the recovery region 21 from the litter region 23. The base 20 will generally include a recovery drawer opening 27 that is configured to receive a recovery drawer 30 that can be placed beneath grate 22. Typically, grate 22 and recovery drawer 30 are configured such that litter particles smaller than the openings in grate 22 will fall directly into recovery drawer 30. However, a plurality of grates 22 or a single grate 22 comprised of multiple layers may be used.

Figure 3:
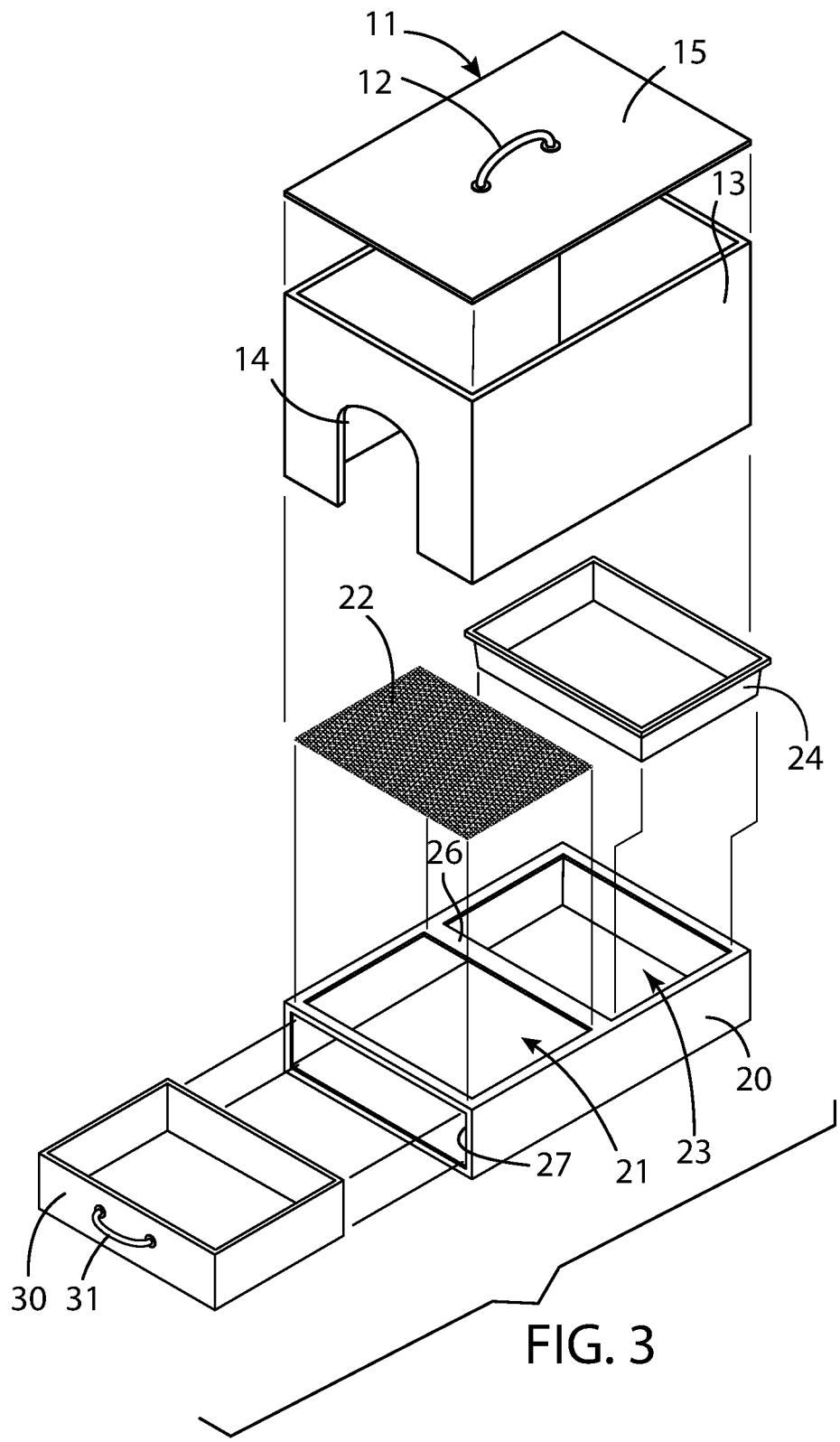
FIG. 3 is an exploded view of a catch drawer litter box in accordance with an example embodiment.

The litter region 23 of base 20 is configured in a manner that makes litter 25 available for waste elimination by cat 40. Litter 25 is generally held within a litter container 24. In some embodiments, litter container 24 is integrated into base 20. In other embodiments, as illustrated in FIG. 3, litter container 24 can be removed from base 20 for easier cleaning or replacement. Litter container 24 may also be comprised of multiple pieces that collectively hold litter 25. In some embodiments, litter container 24 may also comprise a removable liner that rests within litter container 24. In other embodiments, litter container 24 includes a filter than can be removed to quickly remove clumps of litter that form due to waste elimination by cat 40.

Although the base 20 shown in FIGS. 1 through 10 comprises a rectangular profile, other profiles are suitable for use with a catch drawer litter box 10. For example, base 20 may include an oval shape, an elongated hexagon, or an irregular egg shape.

C. Recovery Drawer

A recovery drawer 30 for use with a catch drawer litter box 10 is generally configured to be removably disposed within base 20 and beneath grate 22. In general, recovery drawer 30 is configured to capture any particles of litter 25 that pass through grate 22. However, in some embodiments, grate 22 may partially rest upon an impervious surface such as a lip or border used to support grate 22 and define recovery region 21. In such an embodiment, particles of litter 25 may become trapped such that they do not enter recovery drawer 30. In general, recovery drawer 30 will abut base divider 26 when fully inserted into base 20.

In some embodiments of a catch drawer litter box 10, recovery drawer 30 comprises a portion of base 20, such that removal of the recovery drawer 30 removes at least a portion of the sides of base 20. In this type of embodiment, base 20 may comprise one or more posts or a frame without sides. Moreover, base divider 26 may be completely absent, or be comprised of a portion of recovery drawer 30. For example, the recovery drawer 30 may abut a litter container 24 directly rather than a base divider 26 that is a fixed feature of base 20.

Although the recovery drawer 30 shown in FIGS. 1 through 10 is configured for removable attachment via the side of base 20 that is furthest from litter container 24 (i.e., recovery side), recovery drawer 30 may also be configured for removal from one of the sides adjacent to litter container 24 (i.e., common side). For example, if the catch drawer litter box 10 is placed in a corner or adjacent to a wall, it may be advantageous for recovery drawer 30 to be configured for removable deposition into recovery region 23 via an alternate side of base 20.

D. Litter Box Cover

In order to prevent the unwanted dispersal of litter 25 to surrounding areas as part of the waste elimination process, catch drawer litter box 10 will generally include a litter box cover 11. Litter box cover 11 is generally configured to enclose recovery region 21 and litter region 23 of base 20. In some embodiments, litter box cover 11 is comprised of a plurality of litter box sides 13, a litter box opening 14, a litter box top 15, and a cover handle 12. Litter box sides 13 and litter box top 15 prevent cat litter 25 from being dispersed in the areas surrounding the catch drawer litter box 10. Litter box sides 13 and litter box top 15 also provide privacy for cat 40 and concealment of litter 25 for the owner. Litter box opening 14 permits cat 40 to enter and exit the catch drawer litter box 10. The litter box opening 14 is generally configured such that cat 40 must pass over grate 22 in order to reach cat litter 25. However, in some embodiments, litter box opening 14 may have a different shape or location along litter box sides 13. For example, litter box opening 14 may be located on a corner rather than a side. In this type of embodiment, cat 40 may have to turn to the right or left in order to reach litter 25.

Litter box cover 11 may also include a cover handle 12 to aid in the temporary removal of litter box cover 11 or a portion thereof from base 20. In the example shown in FIGS. 2 and 3, a cover handle 12 is attached to litter box top 15, which is removable from litter box sides 13. In some embodiments, one or more cover handles 12 may be attached to litter box sides 13 in addition to or in lieu of a cover handle 12 attached to litter box top 15. In some embodiments, litter box sides 13 and litter box top 15 are configured to form a single unitary structure. In other embodiments, litter box cover 11 may comprise a single structure without clearly identifiable litter box sides 13 and litter box top 15. For example, if litter box cover 11 is comprised of a single unitary structure with a dome shape, there may be no meaningful distinction between litter box sides 13 and litter box top 15. However, even with a dome shaped litter box cover 11, an upper portion of the litter box cover 11 may be independently removable and considered to be litter box top 15. Similarly, a side portion of litter box cover 11 may be independently removable and considered to be a portion of litter box sides 13. In addition, a portion of litter box cover 11 may be hinged such that a temporary opening can be created without complete removal of that portion from litter box cover 11. In addition to surrounding recovery region 21 and litter region 23 while resting upon base 20, as shown in FIGS. 1 through 9, litter box cover 11 may also be configured to surround the entire base 20.

In addition to configurations of litter box cover 11, wherein the litter box cover 11 is independent of base 20, one or more portions of litter box cover 11 may be integrated into base 20. For example, litter box sides 13 may be integrated with base 20. In this embodiment, litter box top 15 may be the only removable portion of litter box cover 11. In other embodiments, litter box top 15 and a portion of litter box sides 13 are removable from litter box cover 11 as a single structure. In some embodiments, such as the one shown in FIG. 10, the entirety of litter box cover 11 may be integrated with base 20.

E. Operation of Preferred Embodiment

In a preferred embodiment, with reference to FIG. 3, catch drawer litter box 10 is comprised of a base 20 and separate litter box cover 11, with the litter box cover 11 being comprised of litter box sides 13 and a separate litter box top 15. Base 20 comprises a recovery region 21 and a litter region 23 that are defined by four sides and a base divider 26. There is a separate litter container 24 that is configured to rest within litter region 23 of base 20, and a grate 22 that is configured to cover recovery region 21 of base 20. Base 20 also includes a recovery drawer 30 that is configured to be removably disposed within base 20 through an opening 27 so as to fit underneath grate 22.

The base 20 is placed in a preferred location for waste elimination. The grate 22 is put in place in the recovery region 21 of base 20. Litter container 24 is placed within the litter region 23 of base 20. A few inches of litter 25 is placed within litter container 24. Recovery drawer 30 is inserted into recovery drawer opening 27 of base 20, such that it rests underneath grate 22. The litter box sides of litter box cover 11 are placed on base 20 so as to enclose recovery region 21 and litter region 23 with litter box opening 14 located near recovery region 21. Litter box top 15 is then placed on top of litter box sides 13 to complete the litter box cover 11 and fully enclose the space above of base 20. At this point, an exemplary catch drawer litter box 10 is in place for use by a cat 40.

Figure 11:
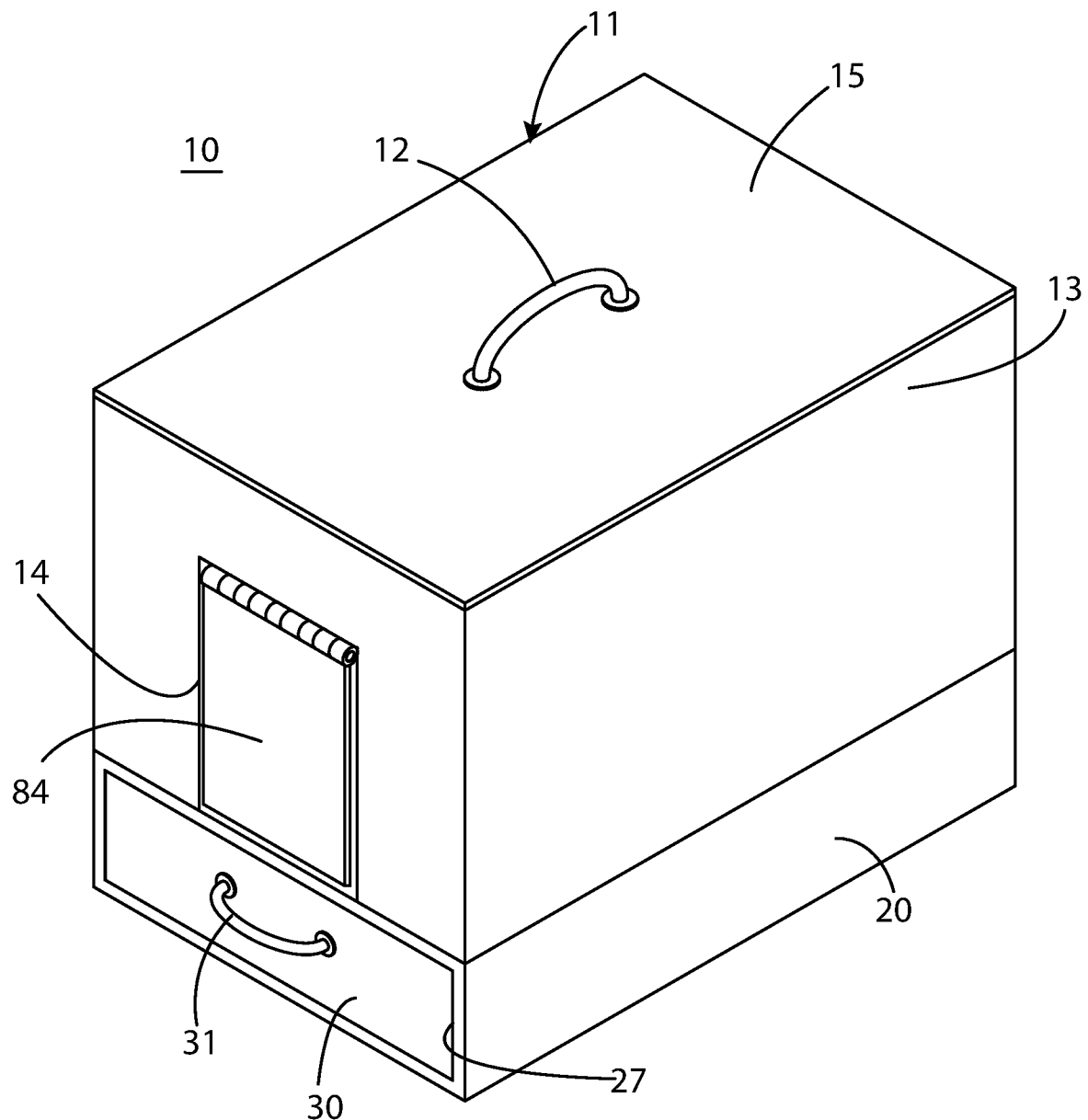
FIG. 11 is a perspective view of a catch drawer litter box with a door attached to the housing to selectively close the opening.

As shown in FIG. 11, a door or flapper 84 may be attached to the housing to selectively close the opening 14. The door or flapper 84 may be comprised of various types of doors or flappers commonly used in the pet industry to selectively close openings.

Figure 6:
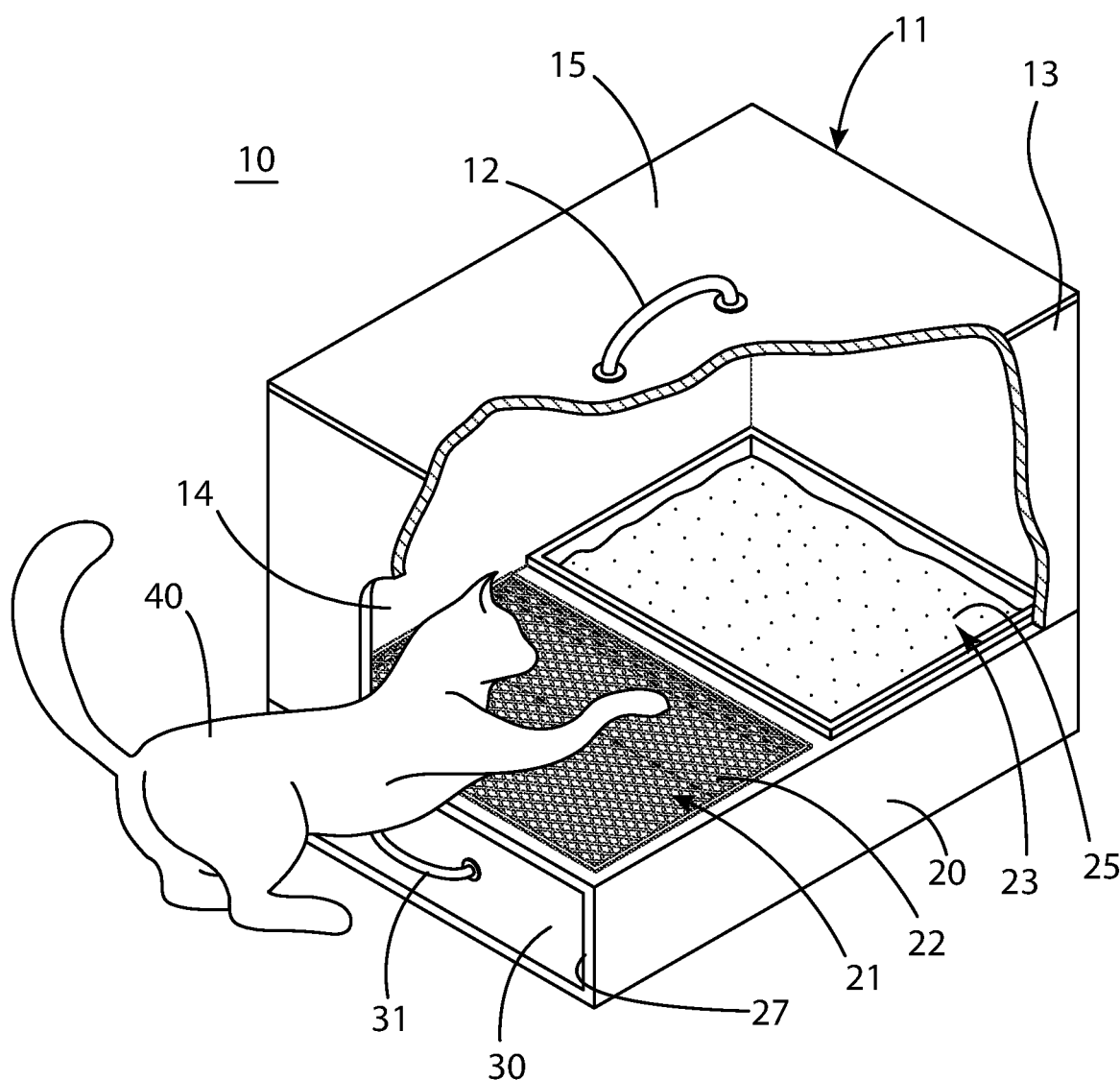
FIG. 6 is a cutaway view of the catch drawer litter box shown in FIG. 1 illustrating a cat entering the catch drawer litter box.
Figure 7:
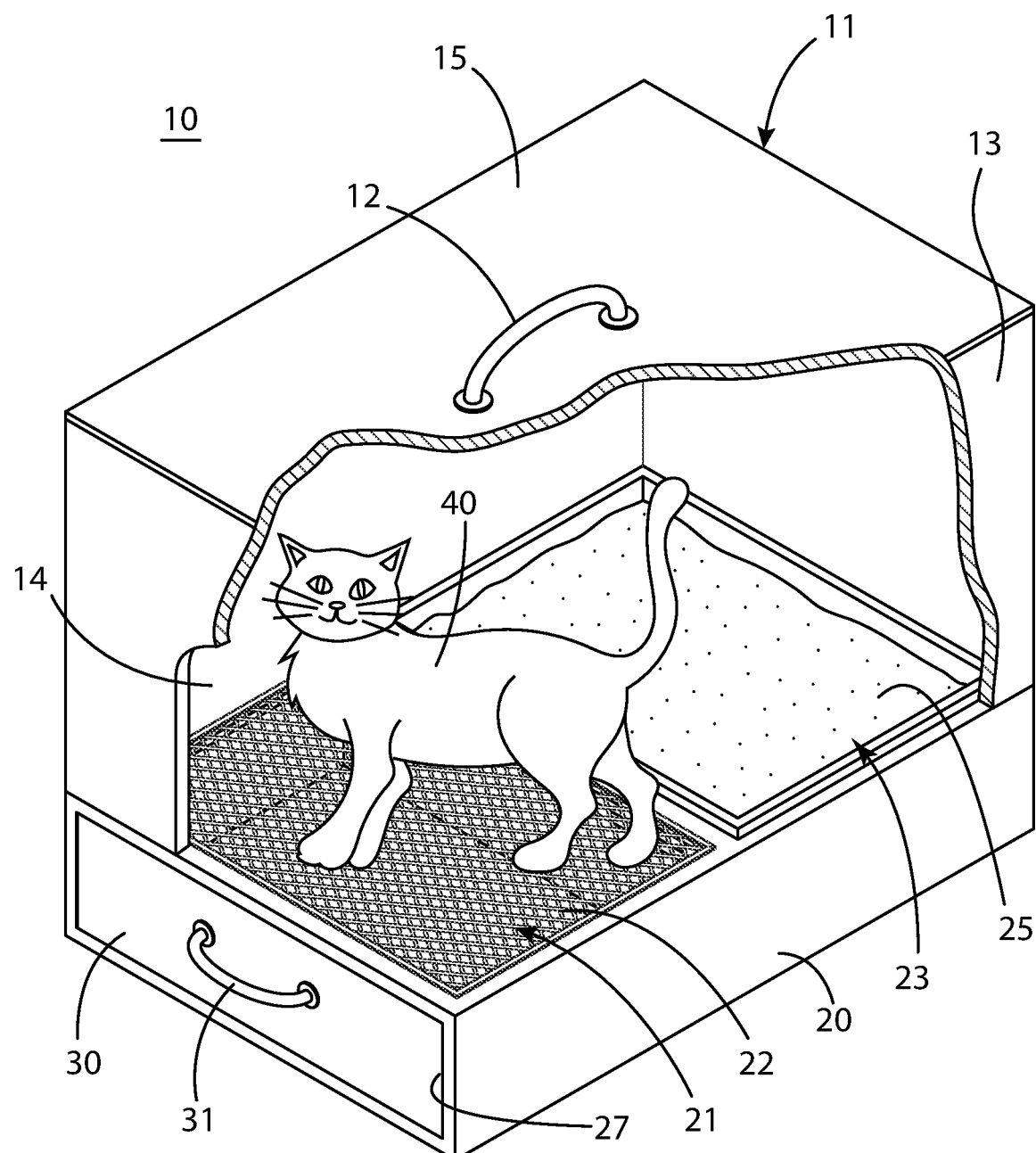
FIG. 7 is a cutaway view of the catch drawer litter box shown in FIG. 1 illustrating a cat preparing to exit the catch drawer litter box.

At various times after the catch drawer litter box 10 has been configured, cat 40 will enter via litter box opening 14, as shown in FIG. 6. Cat 40 will walk across grate 22 in recovery region 21 to reach the litter 25 that is held within the litter container 24 in litter region 23. Cat 40 will then use the litter 25 for purposes of waste elimination. This is generally followed by cat 40 attempting to bury its waste within the litter 25 held in litter container 24. This process of burying waste generally involves cat 40 using its paws to kick particles of litter 25 in the direction of the waste. Stray particles of litter 25 will generally bounce off litter box sides 13 and litter box top 15 and remain within the interior of the catch drawer litter box 10. Ideally, the majority of the stray particles of litter 25 will be reflected back into litter container 24. However, some of the particles will enter the recovery region 21, pass through the openings in grate 22, and land in recovery drawer 30. Still other particles of litter 25 will stick to the paws of cat 40. Ideally, very few particles of litter 25 will leave the catch drawer litter box 10 via opening 14. Having finished burying its waste, cat 40 will walk across grate 22 to exit catch drawer litter box 10 via opening 14, as shown in FIG. 7. The process of walking across grate 22 will generally cause any particles of litter 25 that are stuck to the paws of cat 40 to fall through the openings in grate 22 and into recovery drawer 30.

Figure 8:
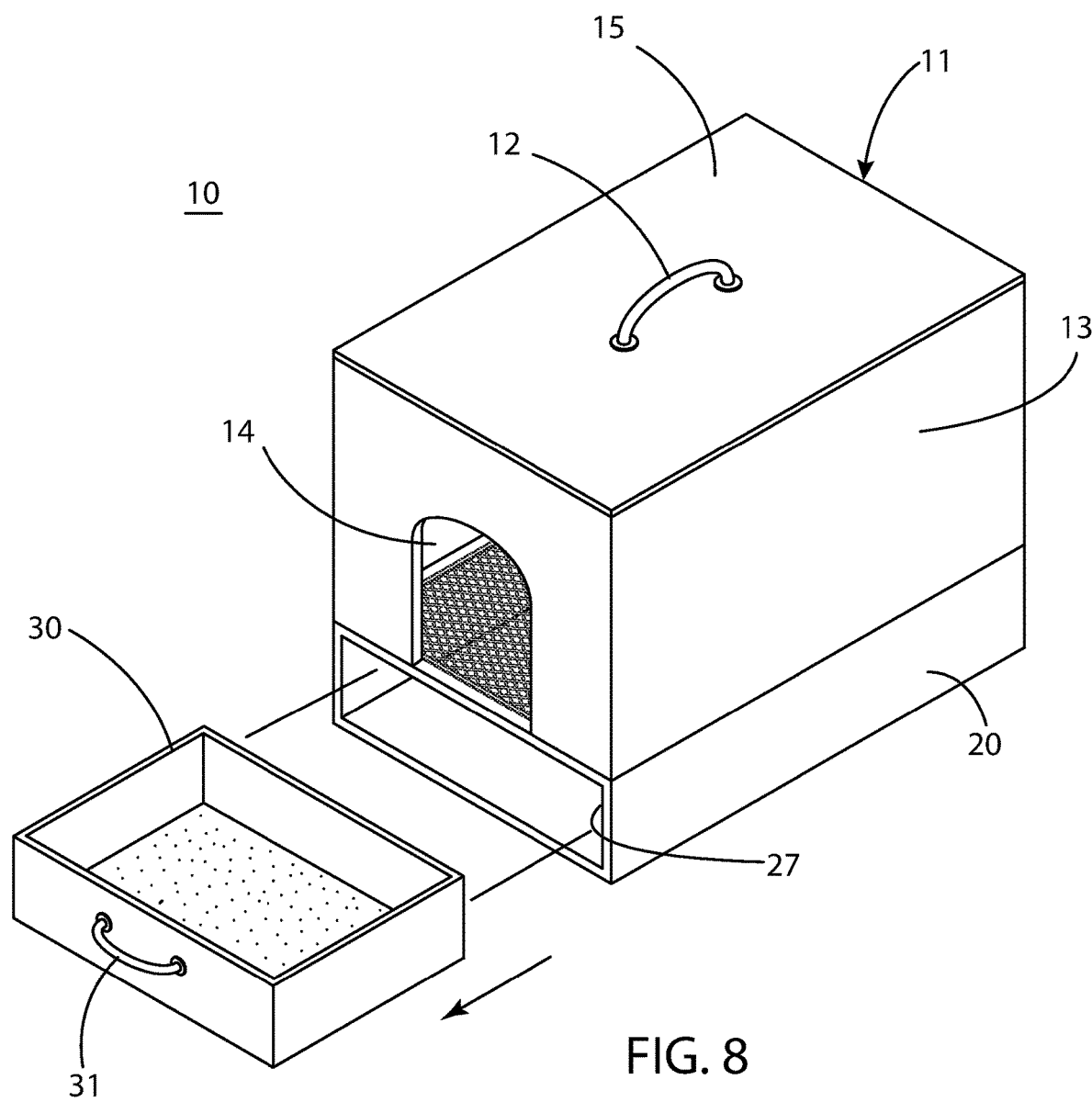
FIG. 8 is a perspective view of a catch drawer litter box in accordance with an example embodiment illustrating the removal of a recovery drawer from the base of the catch drawer litter box.
Figure 9:
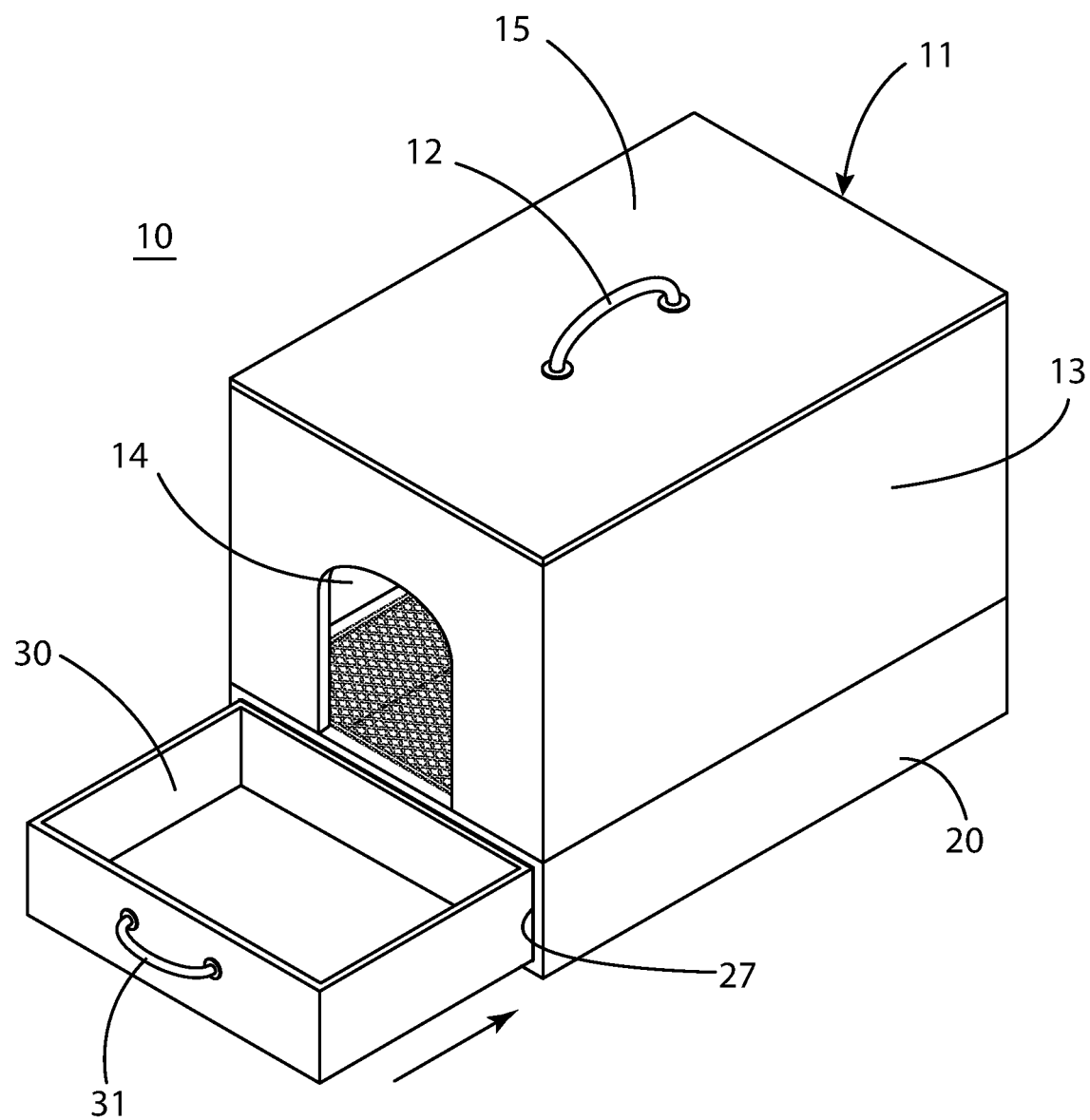
FIG. 9 is a perspective view of a catch drawer litter box in accordance with an example embodiment illustrating the insertion of a recovery drawer into the base of the catch drawer litter box.
Figure 10:
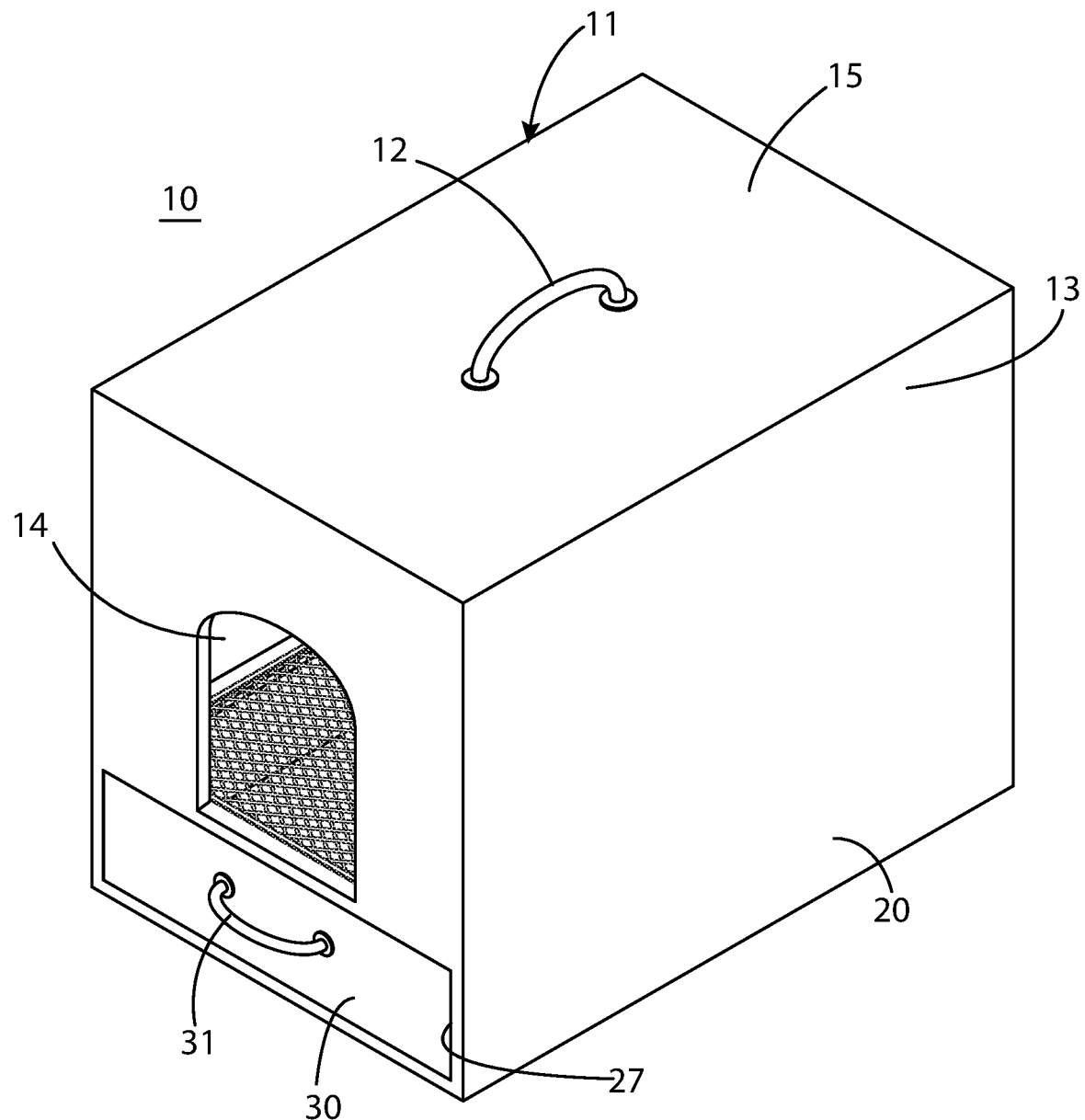
FIG. 10 is a perspective view of a catch drawer litter box comprised of a single structure in accordance with an example embodiment.

After one or more instances of waste elimination by cat 40, with the aid of drawer handle 31, recovery drawer 30 can be removed from base 20 as shown in FIG. 8. Recovery drawer 30 will generally include particles of litter 25 that have been kicked by cat 40 during waste burial and particles of litter 25 that have been scraped from the paws of cat 40 while exiting the catch drawer litter box 10. This recovered litter can either be discarded or returned to litter container 24 to replenish any litter 25 that may have been removed, such as during the cleaning of litter container 24. In some cases, recovery of litter 25 may occur immediately after litter container 24 has been cleaned. To the extent that litter 25 beyond that which was recovered in the recovery drawer 30 is needed, litter 25 can be replenished using fresh litter. After any particles of litter 25 in the recovery drawer have been dealt with, recovery drawer 30 is returned to base 20 via recovery opening 27, as shown in FIG. 9. catch drawer litter box 10 is now available for additional use by cat 40.

F. Alternate Embodiment (FIGS. 12-23)

As shown in FIGS. 12-23, an exemplary embodiment of a catch drawer litter box 10 may comprise a container 50 including an upper end 51, a lower end 52, a front end 53, and a rear end 54. A cavity 60 is defined within the container 50, wherein the cavity 60 is divided between a recovery region 70 and a litter region 78. An opening 59 on the front end 53 of the container 50 may lead to the recovery region 70 of the cavity 60. A transfer opening 64 within the container may connect between the recovery region 70 and the litter region 78. A debris container 75 is removably connected to the container 50 within the recovery region 70 of the cavity 60. The debris container 75 may comprise a grate 76. A cover 80 may be removably connected to the upper end 51 of the container 50. The opening 59 on the front end 53 of the container 50 may be oriented perpendicularly with respect to the transfer opening 64. A divider 61 may be positioned in the cavity 60 between the recovery region 70 and the litter region 78. The divider 61 may comprise a first portion 62 and a second portion 63, with the first portion 62 being comprised of less height than the second portion 63.

The transfer opening 64 may be defined by the first portion 62 of the divider 61. A volume of litter 44 may be stored within the litter region 78 of the cavity 60 of the container 50. The container 50 may comprise a first window 58 on the front end 53 of the container 50 and a second window 58 on the rear end 54 of the container 50. A flange 72 may be positioned within the recovery region 70 of the cavity 60 for removably securing the debris container 75 within the recovery region 70 of the cavity 60.

In another exemplary embodiment, a catch drawer litter box 10 may comprise a container 50 including an upper end 51, a lower end 52, a front end 53, and a rear end 54. A cavity 60 may be defined within the container 50, including a divider 61 within the cavity 60 for dividing the cavity 60 of the container 50 between a recovery region 70 and a litter region 78. An opening 59 on the front end 53 of the container 50 is shown leading to the recovery region 70 of the cavity 60. A transfer opening 64 within the container 50 connects between the recovery region 70 and the litter region 78. A debris container 75 is removably connected to the container 50 within the recovery region 70 of the cavity 60.

The debris container 75 may comprise a grate 76 on an upper end of the debris container 75. The debris container 75 may be adapted to be slid into and out of the cavity 60 through the opening 59 on the front end 53 of the container 50. The opening 59 on the front end 53 of the container 50 may be oriented at a right angle with respect to the transfer opening 64. The divider 61 may comprise a first portion 62 and a second portion 63, wherein the first portion 62 is connected to the front end 53 of the container 50 and the second portion 63 is connected to the rear end 54 of the container 50. The second portion 63 may be comprised of less height than the first portion 62 such that the transfer opening 64 is defined by the second portion 63 of the divider 61. A volume of litter 44 may be stored within the litter region 78 of the cavity 60 of the container 50. The cavity 60 may include a flange 72 within the recovery region 70 of the cavity 60 for removably securing the debris container 75 within the recovery region 70 of the cavity 60.

In yet another exemplary embodiment, a catch drawer litter box 10 may comprise a container 50 including an upper end 51, a lower end 52, a front end 53, and a rear end 54. A cover 80 may be removably connected to the upper end of the container 50, wherein the cover 80 comprises a vent 82.

A cavity 60 may be defined within the container 50, including a divider 61 within the cavity 60 for dividing the cavity 60 of the container 50 between a recovery region 70 and a litter region 78, wherein the divider 61 comprises a first portion 62 having a first height and a second portion 63 having a second height, wherein the first height is greater than the second height. An opening 59 on the front end 53 of the container 50 may lead to the recovery region 70 of the cavity 60. A transfer opening 64 within the container 50 may be connected between the recovery region 70 and the litter region 78, wherein the transfer opening 64 is defined by the second portion 63 of the divider 61, wherein the transfer opening 64 is oriented at a right angle with respect to the opening 59 on the front end 53 of the container 50. A debris container 75 may be removably connected to the container 50 within the recovery region 70 of the cavity 60, wherein an upper end of the debris container 75 comprises a grate 76.

i. Container

As best shown in FIGS. 12-16, an exemplary embodiment may comprise a container 50 includes an upper end 51, a lower end 52, a front end 53, a rear end 54, a first side 55, and a second side 56. The container 50 may comprise various shapes and sizes to suit different applications, such as different sizes of animals. The upper end 51 of the container 50 may comprise an upper opening 66 leading to an internal cavity 60. A cover 80 may be removably connected to the upper end 51 of the container 50 to selectively cover the upper opening 66 as discussed below.

Figure 15:
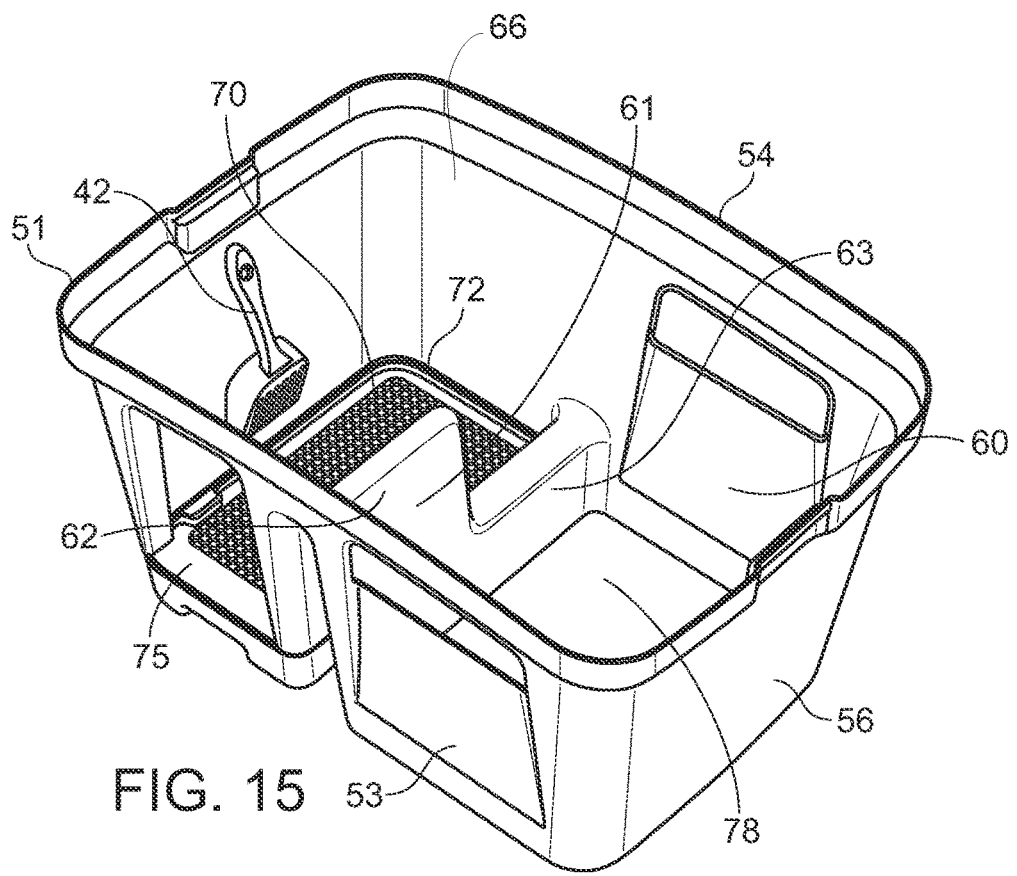
FIG. 15 is an upper perspective view of a catch drawer litter box with the cover removed in accordance with an example embodiment.
Figure 16:
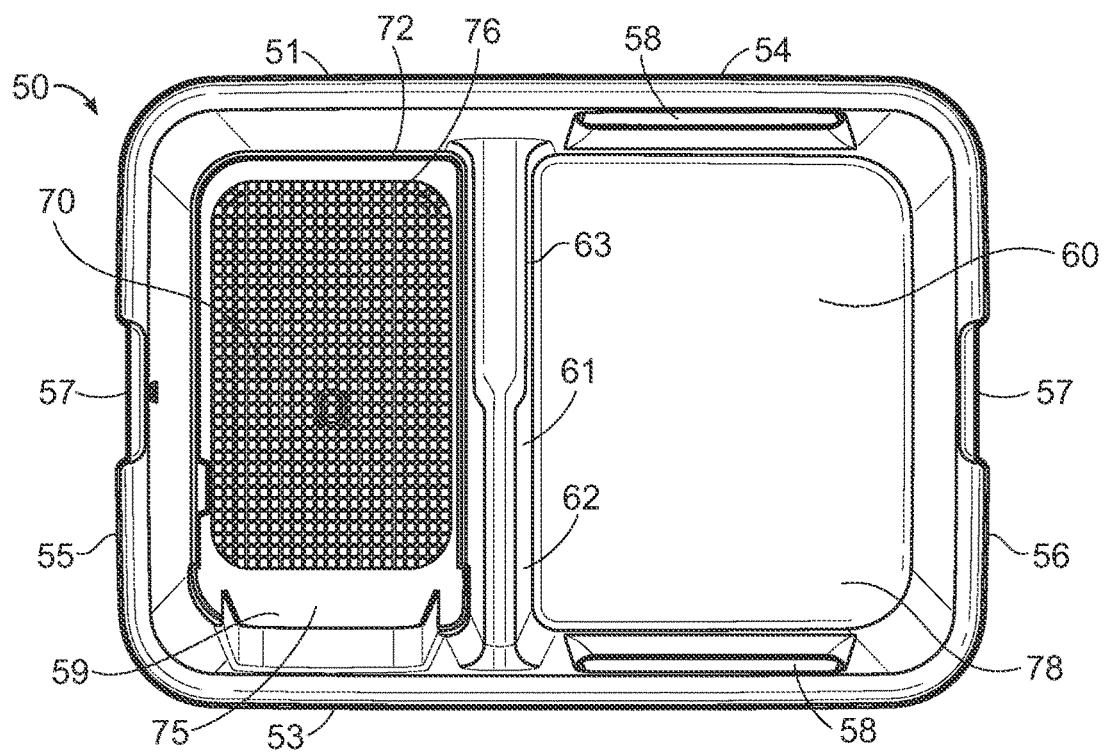
FIG. 16 is a top view of a catch drawer litter box with the cover removed in accordance with an example embodiment.

The lower end 52 of the container 50 may be positioned upon a ground surface. The container 50 may include handle depressions 57 such as shown in FIGS. 15 and 16, in which an exemplary embodiment is illustrated having a pair of handle depressions 57 each of the first and second sides 55, 56 of the container 50 near its upper end 51. These handle depressions 57 may aid in lifting and moving the container 50 if needed, such as for cleaning, storage, or transport. In other embodiments, other types of handles known in the art may be utilized, such as hinged external handles.

The container 50 may comprise windows 58 which provide ventilation within the container 50 and provide vision both into the container 50 by an owner and out of the container 50 by an animal 40. The number, shape, size, and positioning of the windows 58 may vary in different embodiments. In an exemplary embodiment shown in FIG. 15, a pair of windows 58 is illustrated on each of the front and rear ends 53, 54 of the container 50 near its upper end 51.

ii. Cavity

Figure 19:
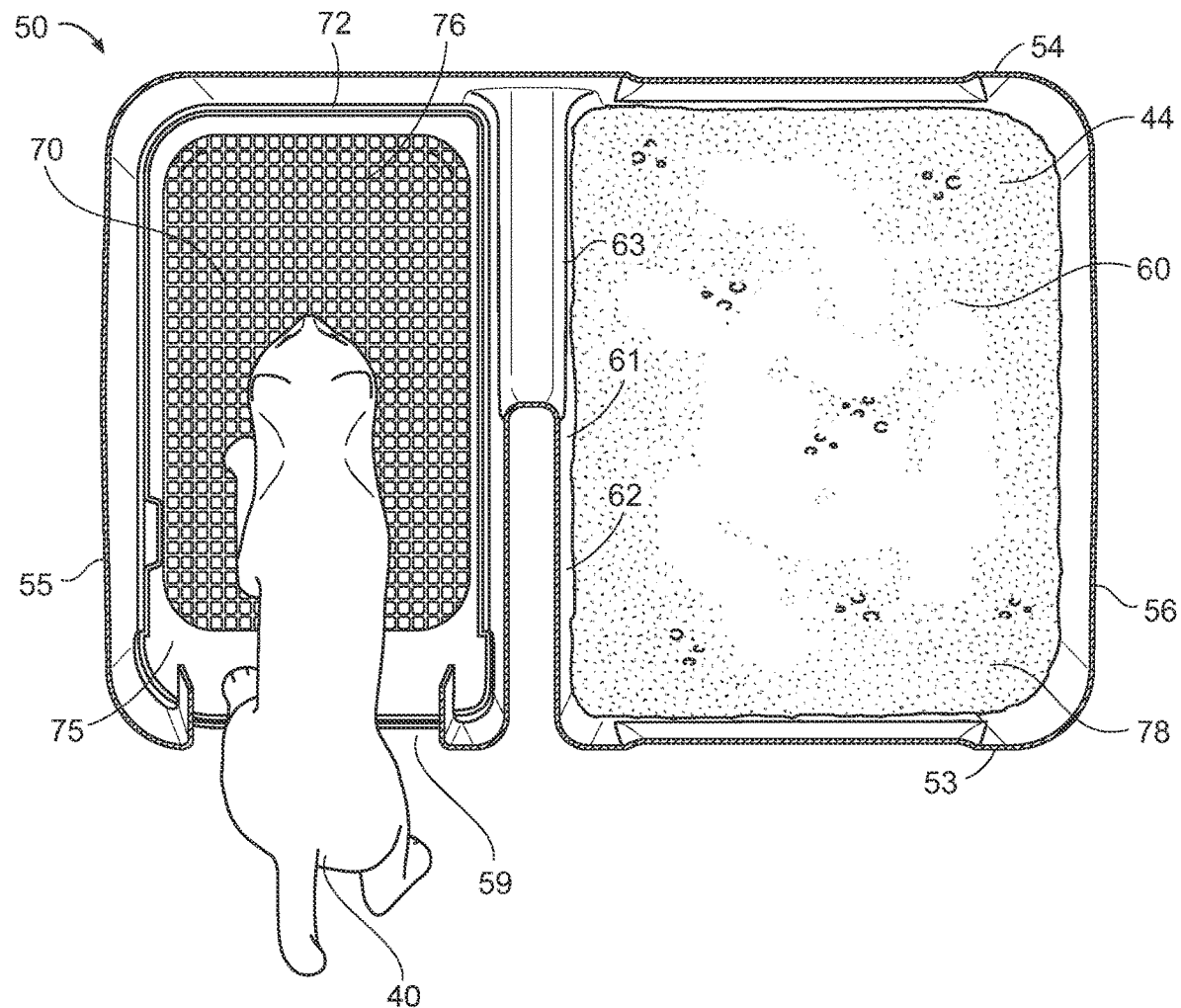
FIG. 19 is a top view of a cat entering a catch drawer litter box in accordance with an example embodiment.
Figure 22:
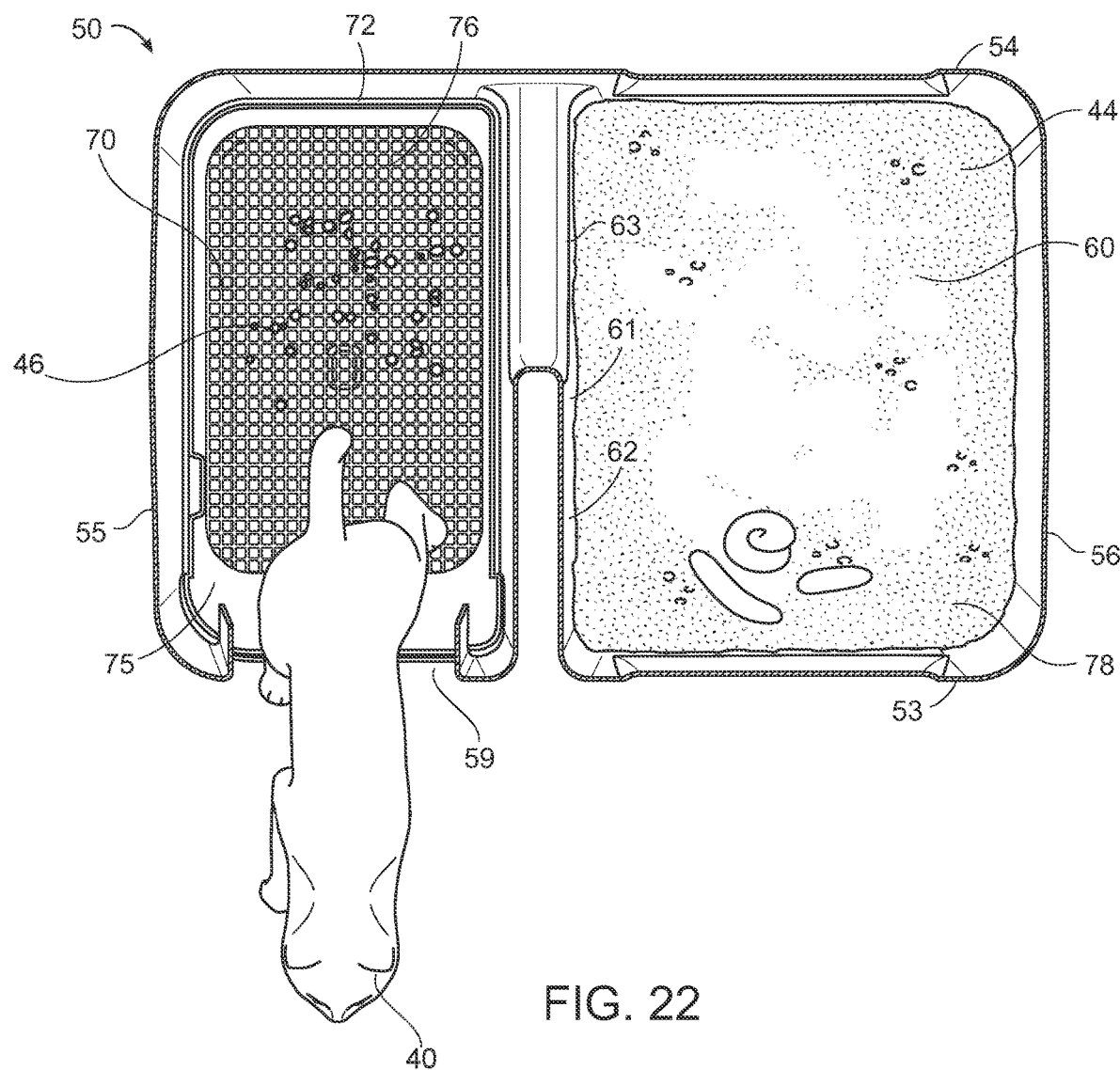
FIG. 22 is a top view of a cat exiting a catch drawer litter box in accordance with an example embodiment.

The container 50 may comprise an entry opening 59 which leads to the internal cavity 60 of the container 50. An animal 40 will generally enter and exit the container through the entry opening 59 such as shown in FIGS. 19 and 22. The entry opening 59 may be positioned at various locations on the container 50. In an exemplary embodiment shown in FIG. 12, the entry opening 59 is positioned on the front end 53 of the container 50 near its first side 55. Reverse positioning may be utilized such as, for example, the entry opening 59 being positioned near the second side 56 of the container 50.

Figure 12:
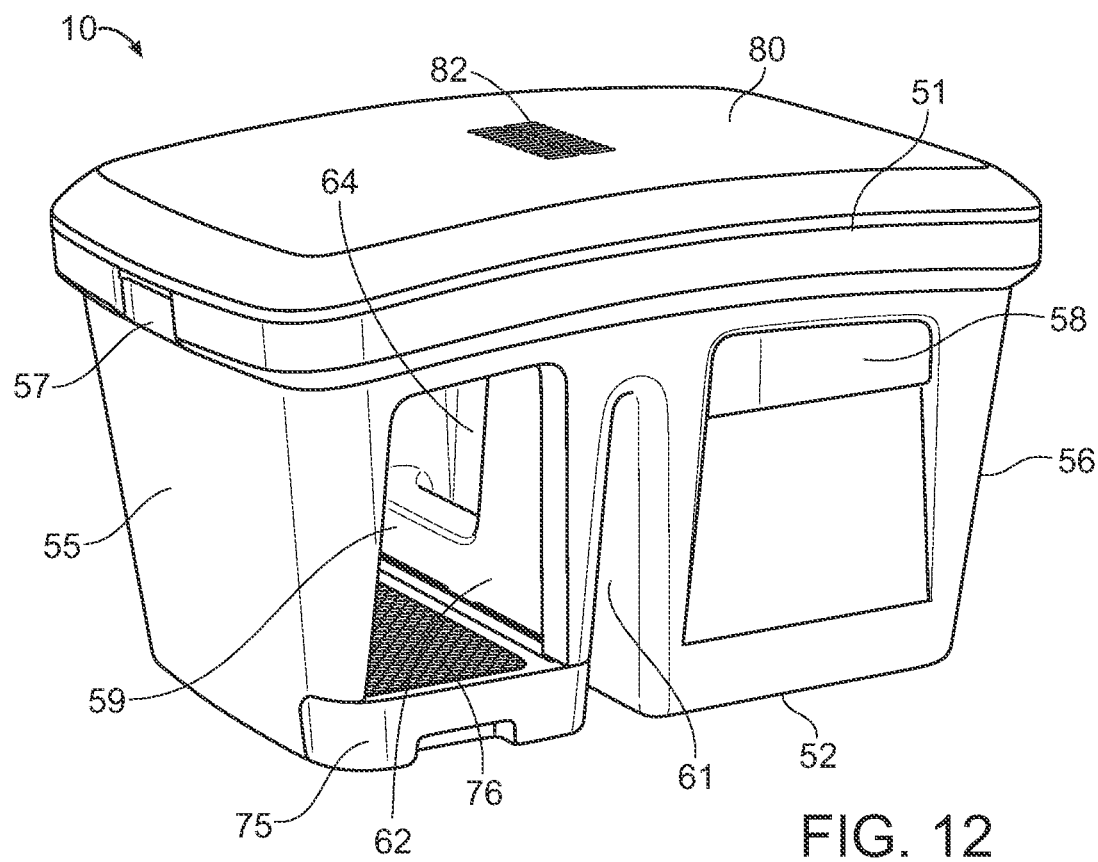
FIG. 12 is a frontal perspective view of a catch drawer litter box in accordance with an example embodiment.

The shape and size of the entry opening 59 may vary depending on the size of the container 50 and the animal 40 being serviced. In the exemplary embodiment shown in FIGS. 12 and 13, the entry opening 59 extends substantially the height between the lower end 52 and the upper end 51 of the container 50. Taller containers 50 may utilize respectively shorter entry openings 59. The entry opening 59 shown in FIG. 12 is comprised of a dome-shaped opening having vertical sides and a curved, semi-circular top.

As best shown in FIGS. 15-23, the cavity 60 of the container 50 may be divided between a recovery region 70 and a litter region 78. The recovery region 70 is generally positioned at the entry point of the container 50, such as behind the entry opening 59. The recovery region 70 is utilized for the animal 40 to clear debris 46 off its paws prior to exiting the container 50 after using the litter region 78. The litter region 78 is utilized by the animal 40 during excretion of waste 45.

A cleaning tool 42 such as a scoop may be stored within the cavity 60, such as within the recovery region 70 as shown in FIG. 15. The manner in which the cleaning tool 42 may be stored within the cavity 60 may vary in different embodiments. As a non-limiting example, FIG. 15 illustrates that the cleaning tool 42 may be hung from a wall within the cavity 60. In some embodiments, the container 50 may comprise an opening where a hook may be inserted on which to hang the cleaning tool 42. In other embodiments, a shelf, looped connectors, adhesives, or other methods may be utilized for removably securing the cleaning tool 42 within the cavity 60.

As shown in FIGS. 16-23, the cavity 60 of the container 50 may include a divider 61 which is positioned between the recovery region 70 and the litter region 78 of the container 50. The divider 61 may serve as a barrier between the recovery region 70 and litter region 78. The shape, size, orientation, and positioning of the divider 61 may vary between different embodiments.

The exemplary embodiment shown in the figures illustrates the divider 61 as being offset from the centerline of the container 50 between its first and second sides 55, 56. This configuration results in a recovery region 70 which is narrower in width than the litter region 78. It should be appreciated that alternate placements of the divider 61 in different embodiments may result in different width ratios between the recovery and litter regions 70, 78. For example, the divider 61 could be positioned at the halfway point between the first and second sides 55, 56 of the container 50, resulting in recovery and litter regions 70, 78 which are of equal width. Alternatively, the divider 61 could be positioned such that the recovery region 70 is wider than the litter region 78.

The divider 61 may include a transfer opening 64 through which the animal 40 may transit between the recovery region 70 and the litter region 78. The animal 40 will generally walk through the transfer opening 64 in a first direction to go from the recovery region 70 to the litter region 78, and then return through the transfer opening 64 in a second direction to go from the litter region 78 to the recovery region 70.

FIGS. 15 and 16 illustrate an exemplary embodiment of a divider 61 in use to separate the cavity 60 of the container 50 between a recovery region 70 and a litter region 78. The illustrated embodiment utilizes a divider 61 which has a first portion 62 and a second portion 63. The first portion 62 extends at a first height from the front of the container 50 toward the rear of the container 50. The second portion 63 extends at a second height from the rear of the container 50 toward the front of the container 50 to meet halfway with the first portion 62.

In the illustrated embodiment, the second portion 63 is shorter than the first portion 62 so as to define the transfer opening 64 between the regions 70, 78. It should be appreciated that the reverse configuration could be utilized, with the first portion 62 being shorter in height than the second portion 63. In other embodiments, the divider 61 may comprise a uniform height, with the transfer opening 64 being formed within the divider 61.

As best shown in FIGS. 15 and 16, the cavity 60 of the container 50 is divided between a recovery region 70 and a litter region 78. The recovery region 70 is positioned at the entry/exit point for the cavity 60 of the container 50 directly behind the entry opening 59 on the front end 53 of the container 50. After an animal 40 such as a cat has used the litter region 78, the animal 40 will be forced to pass through the recovery region 70 which will clear its paws of debris prior to exiting the container 50.

iii. Debris Container

Figure 17:
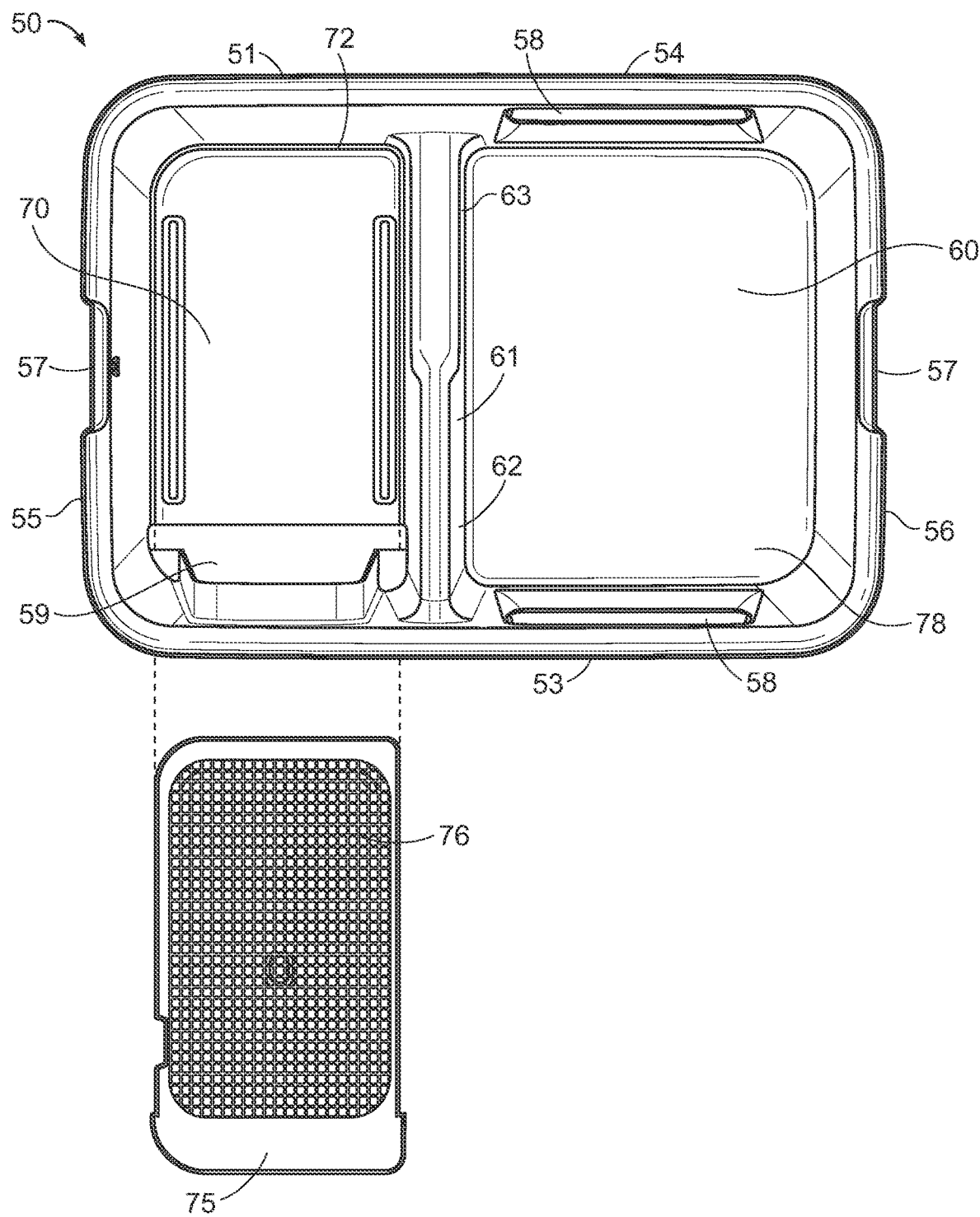
FIG. 17 is a top view of a catch drawer litter box with the cover and the debris container removed in accordance with an example embodiment.
Figure 18:
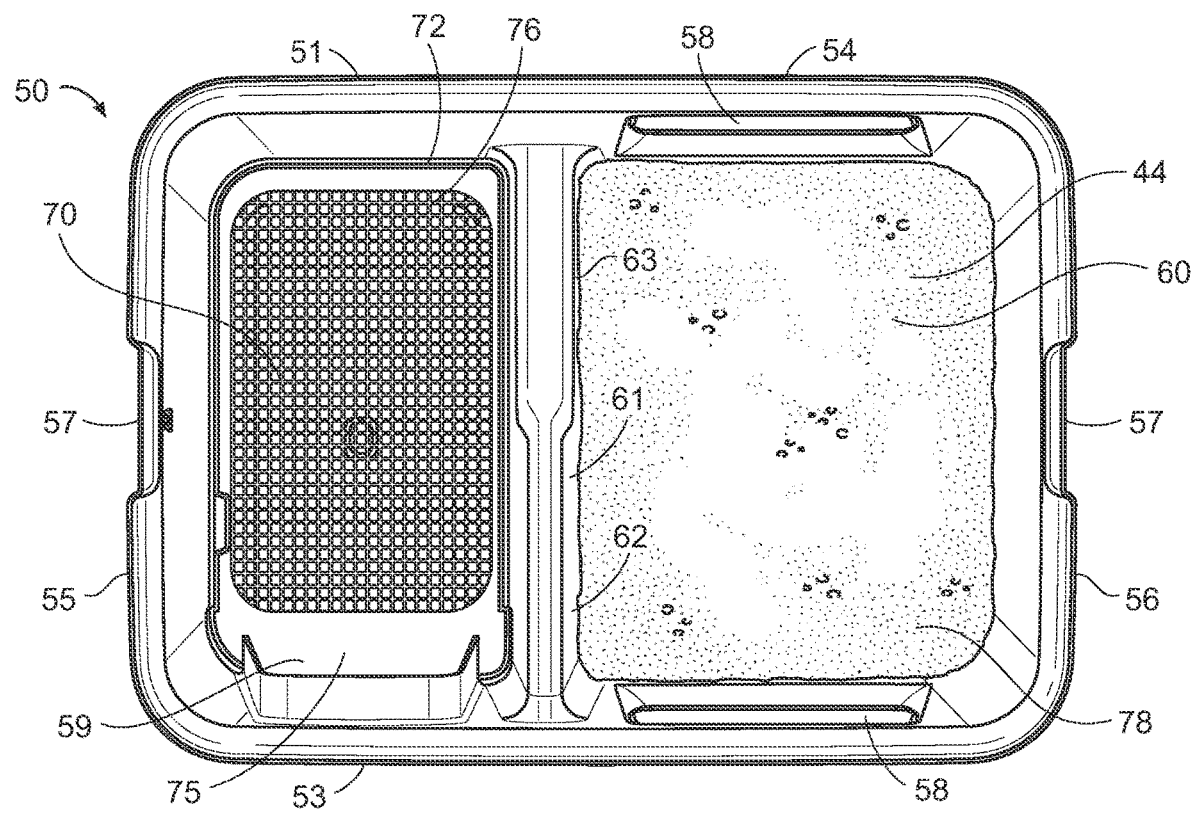
FIG. 18 is a top view of a catch drawer litter box with the cover removed in accordance with an example embodiment.

As shown in FIGS. 16-18, the recovery region 70 may include a debris container 75 which covers the lower end 52 of the container 50. While the figures illustrate that the debris container 75 is removably connected to the container 50, it should be appreciated that, in some embodiments, the debris container 75 may be fixedly or integrally connected to the container 50.

The debris container 75 will generally include a grate 76 at its upper surface, with a cavity defined beneath the grate 76. The grate 76 is configured such that debris 46 will be drawn off of the paws of the animal 40 and fall through the grate 76 into the debris container 75 to be retrieved and cleared later. The shape, size, and number of openings that form the grate 76 may vary in different embodiments and should not be construed as limited by the exemplary figures.

Figure 13:
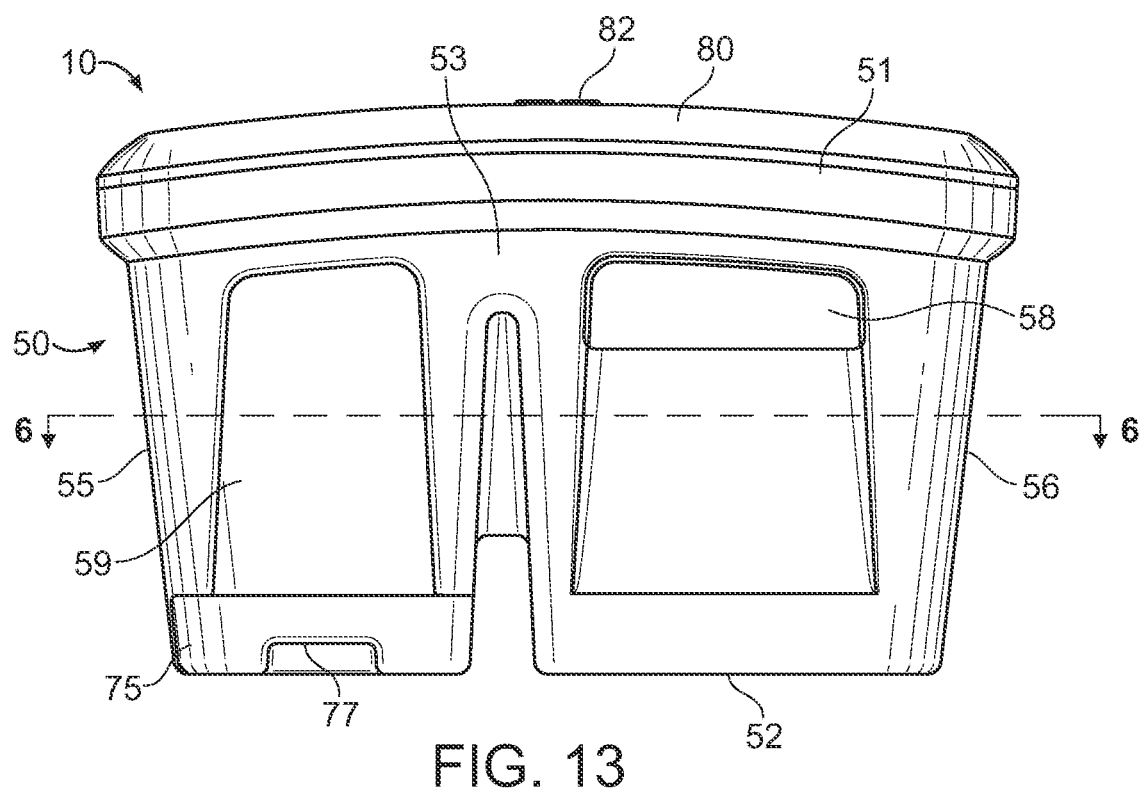
FIG. 13 is a frontal view of a catch drawer litter box in accordance with an example embodiment.
Figure 23:
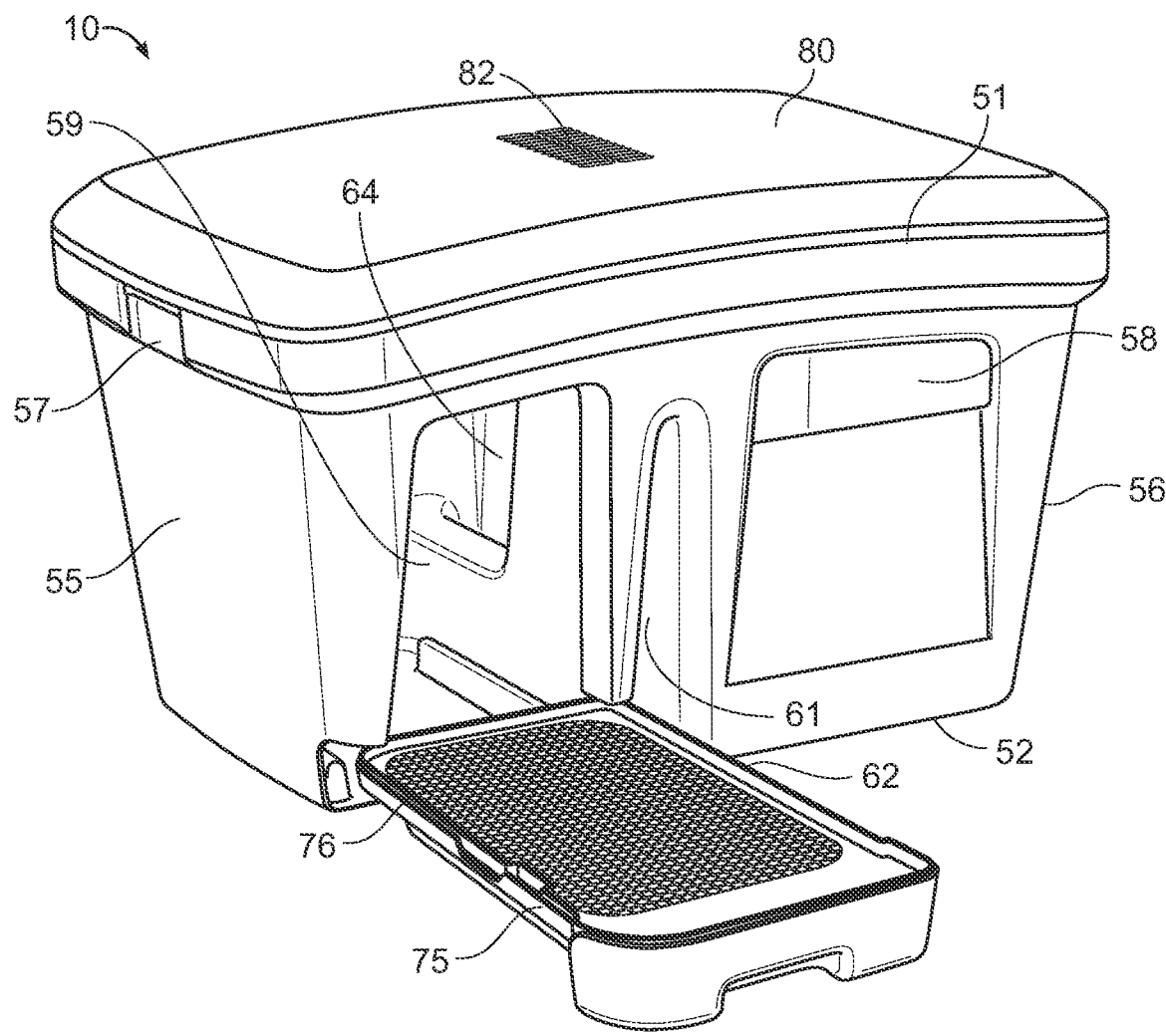
FIG. 23 is a front perspective view of a debris container being removed from a catch drawer litter box in accordance with an example embodiment.

As shown in FIGS. 17 and 23, an exemplary embodiment may comprise a debris container 75 which is removably connected to the container 50. In such an embodiment, the debris container 75 may be inserted into the container 50 and removed from the container 50 through the entry opening 59. As shown in FIG. 13, the debris container 75 may include a handle 77.

The cavity 60 of the container 50 may include a flange 72 which acts as a guide for the debris container 75 as it is inserted into or removed from the cavity 60 of the container 50. Projections such as tabs or the like may be utilized to selectively and removably engage with the debris container 75 so that it may be removably secured within the container 50. Although not shown, various other devices could be utilized to removably secure the debris container 75 within the cavity 60, such as but not limited to clasps, brackets, buckles, ties, magnets, fasteners, and the like.

iv. Cover

Figure 14:
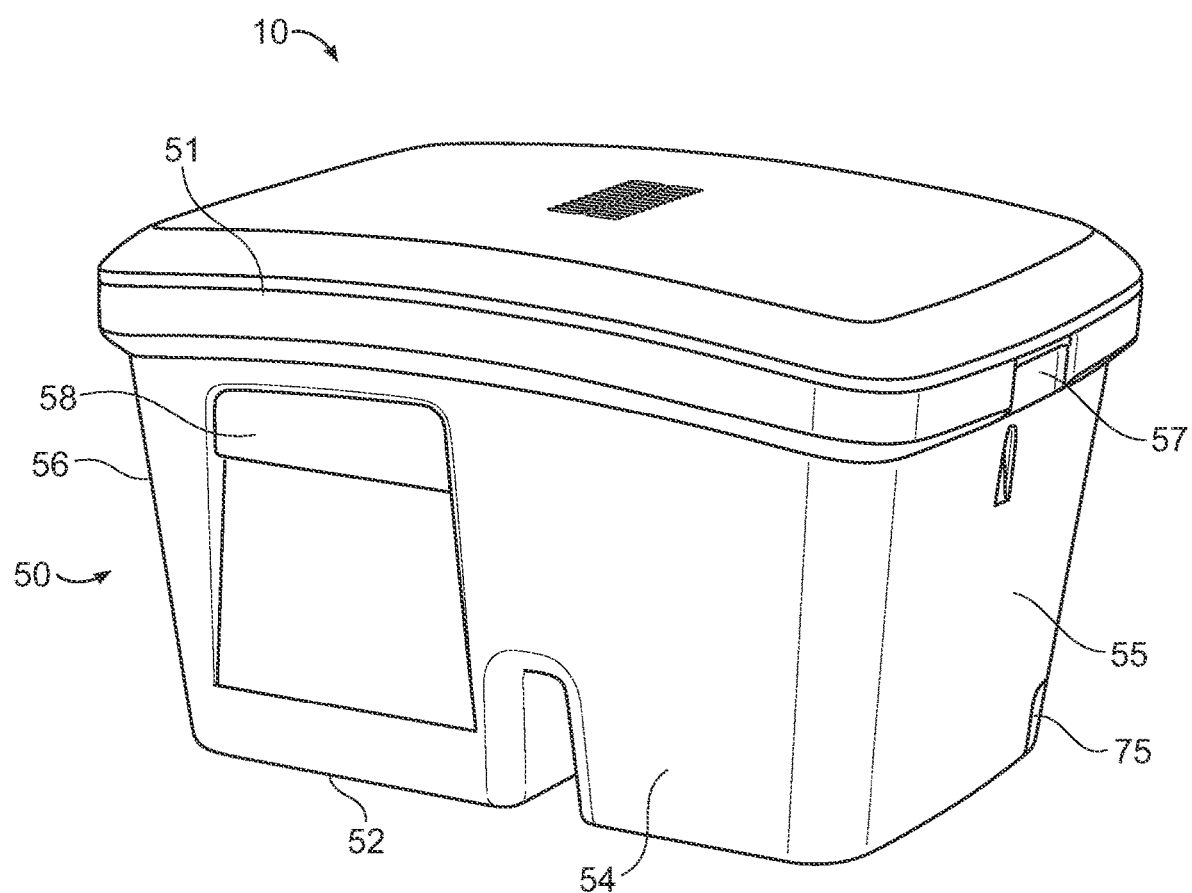
FIG. 14 is a rear perspective view of a catch drawer litter box in accordance with an example embodiment.

As shown in FIGS. 14 and 15, a cover 80 may be removably connected to the upper end 51 of the container 50 so as to selectively cover the upper opening 66 of the cavity 60. The cover 80 may comprise substantially the same shape and/or size as the upper end 51 of the container 50, or may comprise different shapes and/or sizes. The cover 80 may be connected by frictional engagement such as shown in the figures, or may be secured by other methods such as but not limited to clasps, brackets, buckles, ties, magnets, fasteners, and the like. A vent 82 may be positioned on the cover 80 such as shown in FIG. 14 to provide venting to the cavity 60 when it is covered by the cover 80. In some embodiments, the vent 82 may be configured to receive a filter, such as a charcoal filter to reduce odors permeating from the cavity 60.

v. Operation of Alternate Embodiment

FIGS. 19-22 illustrate the catch drawer litter box 10 in use. As seen in FIG. 19, an animal 40 such as a cat will first enter into the cavity 60 through the entry opening 59 of the container 50. After passing through the entry opening 59, the animal 40 will be in the recovery region 70 standing on the grate 76 as shown in FIG. 19.

Figure 20:
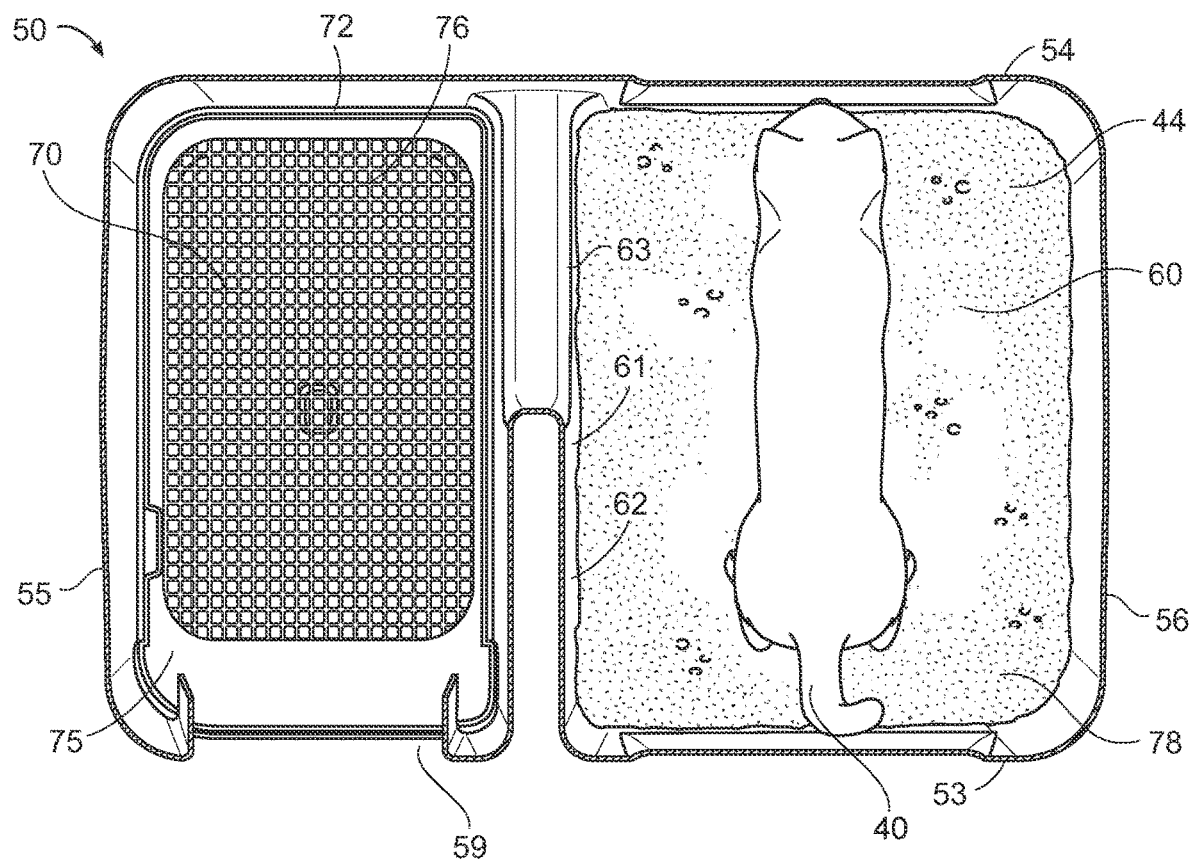
FIG. 20 is a top view of a cat eliminating waste within the litter region of a catch drawer litter box in accordance with an example embodiment.

As shown in FIG. 20, the animal 40 may then turn at a right angle to traverse through the transfer opening 64 into the litter region 78 which will have previously been filled with litter 44. The litter 44 may be stored directly within the litter region 78 of the container 50, or a separate litter box may be positioned within the litter region 78, with the separate litter box storing the litter 44. In either case, the animal 40 will stay within the litter region 78 to evacuate waste 45 such as feces. Animals 40 such as cats will often play with or bury the waste 45, which collects debris 46 such as clumps of litter 44 on the paws of the animals 40.

Figure 21:
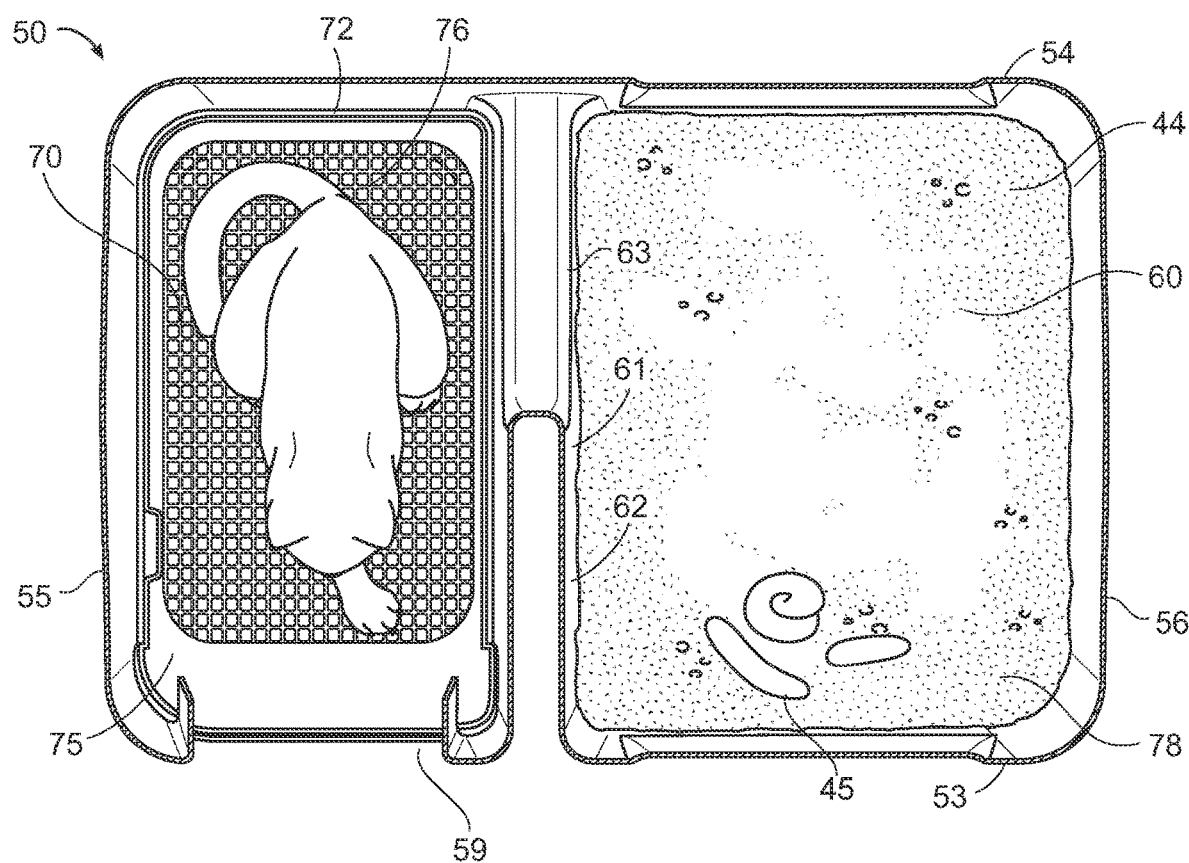
FIG. 21 is a top view of a cat passing through the recovery region while exiting a catch drawer litter box in accordance with an example embodiment.

As shown in FIG. 21, after eliminating waste 45 in the litter 44 of the litter region 78, the animal 40 will pass back through the transfer opening 64 and into the recovery region 70. The animal 40 is forced to pass through the recovery region 70 to exit the container 50 so that the recovery region 70 may recovery debris 46 from the paws of the animal 40. When passing over the recovery region 70, debris 46 will fall off of the paws of the animal 40, through the grate 76, and into the debris container 75. The animal 40 may then pass through the entry opening 59 to exit the container 50 as shown in FIG. 22.

As shown in FIG. 23, the debris container 75 may be periodically removed through the entry opening 59 to be emptied. In some embodiments, the grate 76 may be removable so that the debris container 75 may be dumped out, such as in the trash or recycled back into the litter region 78. The debris container 75 may then be reinserted into the container 50 through the entry opening 59 and secured therein by the flange 72 and projection 73 such as shown in FIG. 16 awaiting further use. The litter 44 may also be periodically cleaned out of the litter region 78 and replaced with clean litter 44 as needed.

Unless otherwise defined, all technical and scientific terms used herein have the same meaning as commonly understood by one of ordinary skill in the art to which this invention belongs. Although methods and materials similar to or equivalent to those described herein can be used in the practice or testing of the catch drawer litter box, suitable methods and materials are described above. All publications, patent applications, patents, and other references mentioned herein are incorporated by reference in their entirety to the extent allowed by applicable law and regulations. The catch drawer litter box may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A catch drawer litter box, comprising:
a container including an opening and a transfer opening;
a cavity within the container, wherein the cavity is divided between a recovery region and a litter region, wherein the opening of the container leads to the recovery region of the cavity, wherein the transfer opening of the container is positioned between the recovery region and the litter region;

a guide member connected to a floor of the recovery region of the cavity within the container; and a debris container removably connected to the container within the recovery region of the cavity, wherein the guide member is adapted to guide the debris container as the debris container is inserted into or removed from the cavity, wherein the debris container includes a slot for engaging with the guide member.

2. The catch drawer litter box of claim 1, further comprising a flange within the recovery region of the cavity for removably securing the debris container within the recovery region of the cavity.

3. The catch drawer litter box of claim 1, further comprising a cover removably connected to an upper end of the container.

4. The catch drawer litter box of claim 1, wherein the opening of the container is oriented perpendicularly with respect to the transfer opening of the container.

5. The catch drawer litter box of claim 1, comprising a divider in the cavity between the recovery region and the litter region.

6. The catch drawer litter box of claim 5, wherein the divider comprises a first portion and a second portion, wherein the first portion is comprised of less height than the second portion.

7. The catch drawer litter box of claim 6, wherein the transfer opening is defined by the first portion of the divider.

8. The catch drawer litter box of claim 1, further comprising a volume of litter stored within the litter region of the cavity of the container.

9. The catch drawer litter box of claim 1, wherein the opening is positioned on a front end of the container.

10. A catch drawer litter box, comprising:
a container including an opening and a transfer opening;
a cavity within the container;
a divider within the cavity for dividing the cavity of the container between a recovery region and a litter region, wherein the opening of the container leads to the recovery region of the cavity, wherein the transfer opening of the container is positioned between the recovery region and the litter region;
a pair of guide members connected to a floor of the recovery region of the cavity within the container; and
a debris container removably connected to the container within the recovery region of the cavity, wherein the pair of guide members are adapted to guide the debris container as the debris container is inserted into or removed from the cavity, wherein the debris container includes a pair of slots for engaging with the pair of guide members.

11. The catch drawer litter box of claim 10, wherein the debris container is adapted to be slid into and out of the cavity through the opening of the container.

12. The catch drawer litter box of claim 10, wherein the opening of the container is oriented at a right angle with respect to the transfer opening.

13. The catch drawer litter box of claim 10, further comprising a flange within the recovery region of the cavity for removably securing the debris container within the recovery region of the cavity.

14. The catch drawer litter box of claim 10, wherein the opening of the container is positioned on a front end of the container.

15. The catch drawer litter box of claim 10, further comprising a cover removably connected to an upper end of the container.

16. The catch drawer litter box of claim 10, further comprising a volume of litter stored within the litter region of the cavity of the container.

17. The catch drawer litter box of claim 10, further comprising a filter removably connected to the container.

18. A catch drawer litter box, comprising:
a container including an upper end, a lower end, a front end, and a rear end;
a cover removably connected to the upper end of the container, wherein the cover comprises a vent;
a cavity within the container;
a divider within the cavity for dividing the cavity of the container between a recovery region and a litter region, wherein the divider comprises a first portion having a first height and a second portion having a second height, wherein the first height is greater than the second height;
a guide member connected to a floor of the recovery region of the cavity within the container;
an opening on the front end of the container, wherein the opening leads to the recovery region of the cavity;
a transfer opening within the container connecting between the recovery region and the litter region, wherein the transfer opening is defined by the second portion of the divider, wherein the transfer opening is oriented at a right angle with respect to the opening on the front end of the container;
a debris container removably connected to the container within the recovery region of the cavity, wherein an upper end of the debris container comprises a grate, wherein the debris container is adapted to be slid into and out of the cavity through the opening on the front end of the container, wherein the debris container includes a slot for engaging with guide member; and
a flange within the recovery region of the cavity for removably securing the debris container within the recovery region of the cavity, wherein the flange and the guide member are each adapted to guide the debris container as the debris container is slid into or out of the cavity.

* * * * *